United States Patent
Humfeld et al.

(10) Patent No.: US 12,138,867 B2
(45) Date of Patent: Nov. 12, 2024

(54) SYSTEM AND METHOD FOR A HEATING OPERATION PROCESS CONTROL

(71) Applicant: THE BOEING COMPANY, Chicago, IL (US)

(72) Inventors: Keith D. Humfeld, Federal Way, WA (US); Geoffrey A. Butler, Seattle, WA (US); Karl M. Nelson, Issaquah, WA (US)

(73) Assignee: THE BOEING COMPANY, Arlington, VA (US)

( * ) Notice: Subject to any disclaimer, the term of this patent is extended or adjusted under 35 U.S.C. 154(b) by 548 days.

(21) Appl. No.: 17/505,875

(22) Filed: Oct. 20, 2021

(65) Prior Publication Data
US 2022/0219411 A1    Jul. 14, 2022

Related U.S. Application Data

(60) Provisional application No. 63/196,309, filed on Jun. 3, 2021, provisional application No. 63/136,742, filed on Jan. 13, 2021.

(51) Int. Cl.
*G05B 13/02* (2006.01)
*B29C 70/44* (2006.01)
(Continued)

(52) U.S. Cl.
CPC .......... *B29C 70/44* (2013.01); *B29C 70/54* (2013.01); *G05B 13/0265* (2013.01); *G06N 3/08* (2013.01)

(58) Field of Classification Search
CPC ..... B29C 70/44; B29C 70/54; B29C 35/0288; B29C 35/0227; B29C 2035/046; G05B 13/0265; G06N 3/08
See application file for complete search history.

(56) References Cited

U.S. PATENT DOCUMENTS

| 5,207,956 A | * | 5/1993 | Kline | B29C 35/0288 |
| | | | | 264/40.6 |
| 5,345,397 A | * | 9/1994 | Handel | B29C 35/0288 |
| | | | | 425/30 |

(Continued)

OTHER PUBLICATIONS

Zhang et al., "A physical model and data-driven hybrid prediction method towards quality assurance for composite components", Jun. 2021, CIRP Annals—Manufacturing Technology 70, pp. 115-118, URL: <https://www.sciencedirect.com/science/article/pii/S000785062100086X> (Year: 2021).*

(Continued)

*Primary Examiner* — Kenneth M Lo
*Assistant Examiner* — Jonathan Michael Skrzycki
(74) *Attorney, Agent, or Firm* — Moore IP Law

(57) ABSTRACT

Heating operation control includes obtaining sensor data indicating measured temperatures within a heating vessel during a heating operation; determining sets of thermal stack parameters. Each set of candidate thermal stack parameters is descriptive of a respective configuration of a thermal stack modeled by a first machine learning model to generate one or more estimated tool temperature values. The thermal stack includes the tool and a part coupled to the tool. Heating operation control also includes determining a temperature profile for the heating operation. The temperature profile is determined, via a second machine learning model, based on the plurality of sets of thermal stack parameters and one or more process specifications of the thermal stack.

20 Claims, 10 Drawing Sheets

(51) Int. Cl.
 *B29C 70/54* (2006.01)
 *G06N 3/08* (2023.01)

(56) References Cited

U.S. PATENT DOCUMENTS

| | | | |
|---|---|---|---|
| 5,453,226 A * | 9/1995 | Kline | B29C 35/0288 |
| | | | 264/40.6 |
| 2008/0175753 A1* | 7/2008 | Clothier | B29C 35/0227 |
| | | | 422/26 |
| 2021/0008766 A1* | 1/2021 | Kuruppuarachchige | |
| | | | B64F 5/10 |

OTHER PUBLICATIONS

Jahromi et al., "Prediction and optimization of cure cycle of thick fiber-reinforced composite parts using dynamic artificial neural networks", 2012, Journal of Reinforced Plastics and Composites, vol. 31, Iss 18, pp. 1201-1215, URL :<https://journals.sagepub.com/doi/epub/10.1177/0731684412451937> (Year: 2012).*

Niaki et al. "Physics-Informed Neural Network for Modelling the Thermochemical Curing Process,,,", 2020, URL:https://www.researchgate.net/publication/346475345_Physics-Informed_Neural_Network_for_Modelling_the_Thermochemical_Curing_Process_of_Composite-Tool_Systems_During_Manufacture (Year: 2020).*

* cited by examiner

200

202
Obtain sensor data indicating measured temperatures within a heating vessel during a first portion of a heating operation, wherein the sensor data includes tool temperature values and interior temperature values, wherein a tool temperature value represents a temperature measurement of a portion of a tool within the heating vessel and an interior temperature value represents a temperature measurement of ambient conditions within the heating vessel

204
Determine a plurality of sets of thermal stack parameters from a plurality of sets of candidate thermal stack parameters, wherein each set of candidate thermal stack parameters is descriptive of a respective configuration of an in-process thermal stack modeled by a first machine learning model to generate one or more estimated tool temperature values, and wherein the in-process thermal stack comprises the tool and a part coupled to the tool

206
Determine a temperature profile for a second portion of the heating operation, wherein the temperature profile is determined, via a second machine learning model, based on the plurality of sets of thermal stack parameters and one or more process specifications of the in-process thermal stack

FIG. 2

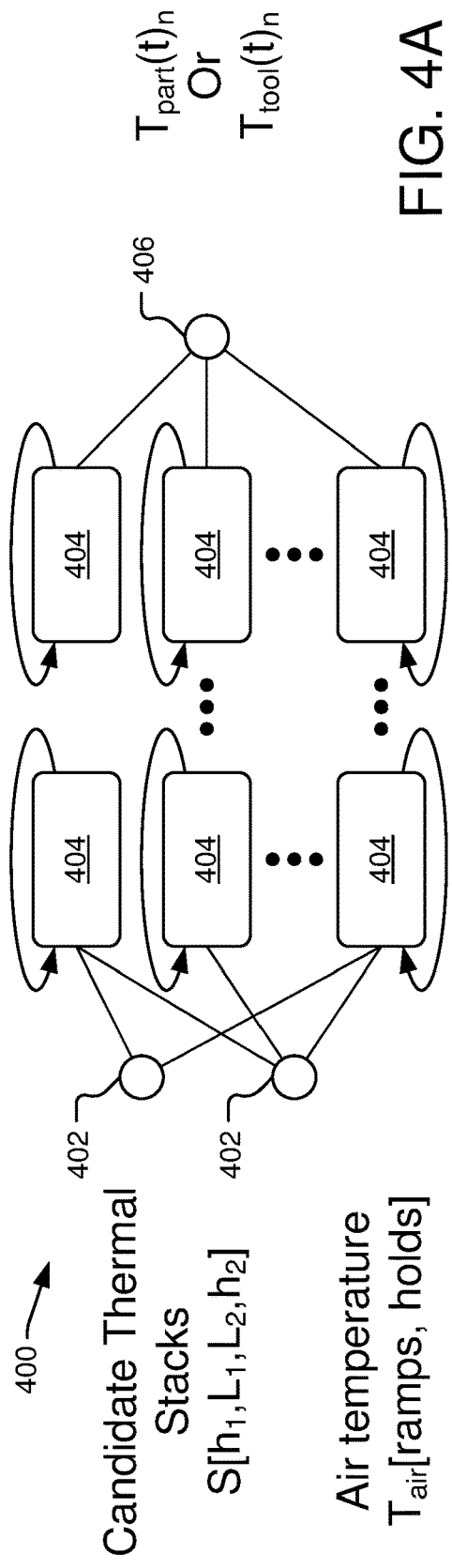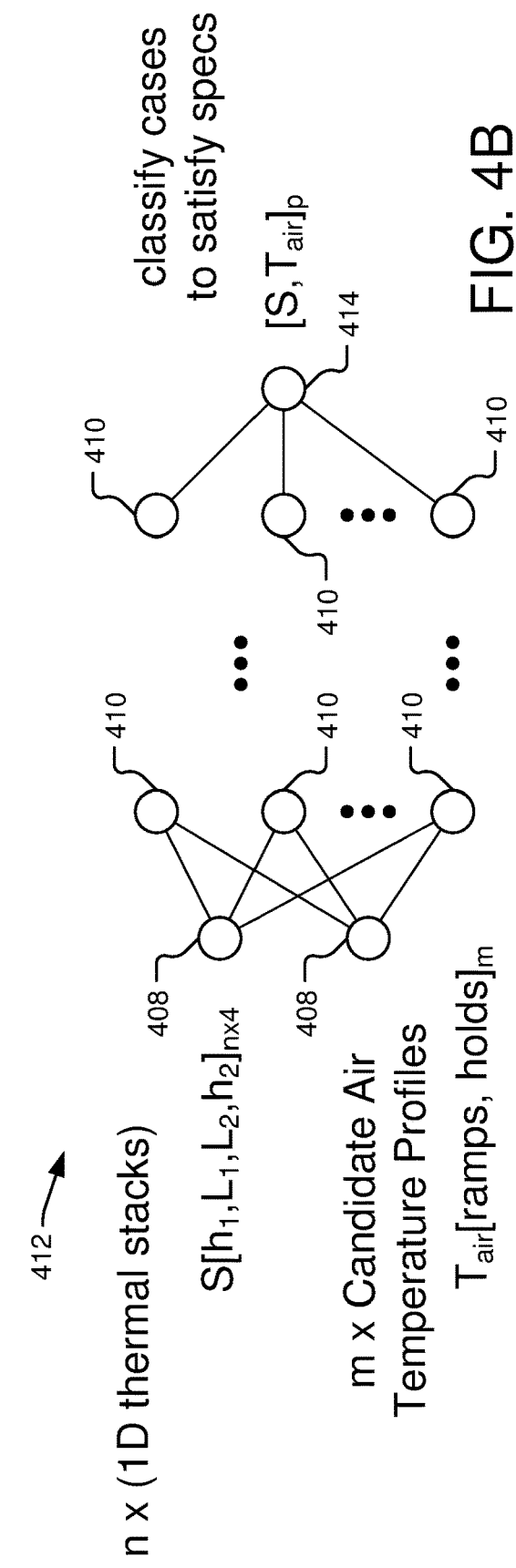
FIG. 4A
FIG. 4B

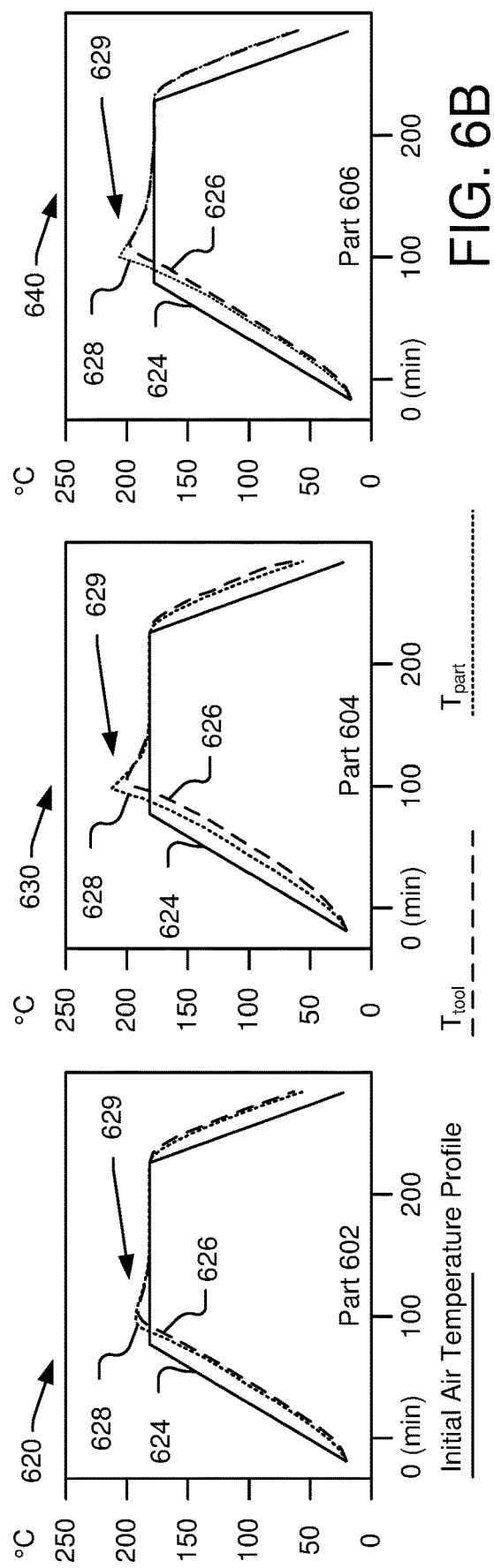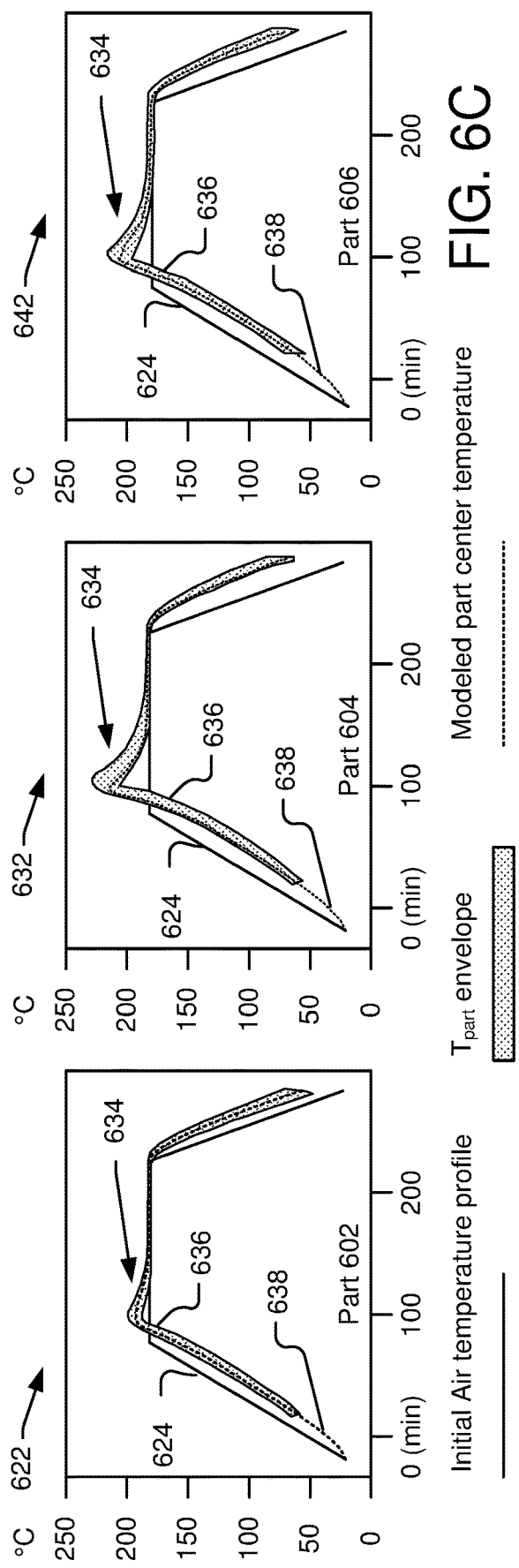
FIG. 6B
FIG. 6C

SYSTEM AND METHOD FOR A HEATING OPERATION PROCESS CONTROL

CROSS-REFERENCE TO RELATED APPLICATIONS

This application claims the benefit of U.S. Provisional Application No. 63/136,742, filed Jan. 13, 2021, and entitled "MACHINE LEARNING-BASED APPROACH FOR REAL-TIME OPTIMIZATION AND ACTIVE CONTROL OF COMPOSITES AUTOCLAVE PROCESSING," and U.S. Provisional Application No. 63/196,309, filed Jun. 3, 2021, and entitled "HEATING OPERATION PROCESS CONTROL" all of which are incorporated herein by reference.

FIELD OF THE DISCLOSURE

The present disclosure is generally related to control of heating operations.

BACKGROUND

Composite parts are often heated via convection in ovens or autoclaves. For some use cases, a specification may indicate characteristics of a part temperature history that should be satisfied to ensure part quality. Such specifications may define a part temperature, a part temperature change rate, a dwell time at a particular temperature, or other characteristics of the part temperature history. In some circumstances, out-of-specification parts have under-cured areas, undesired porosity, fiber waviness/wrinkling, residual stresses, or other undesirable properties.

Experimental thermal profiling, numerical process simulation of the thermo-chemical curing reaction, or both, may be used to design a cure cycle to conform to the part temperature history requirements of the specification. Based on these experiments and simulations, lagging locations and leading locations of parts are identified. Thermocouples are placed near these locations to monitor part temperature history. However, in many cases, parts are heated while coupled to a tool (e.g., a mandrel or form), which impedes access to the lagging and leading locations. In such situations, thermocouples are placed near these locations at the backside of the tool as proxies for the locations and leading locations.

When multiple parts are cured together in an autoclave or oven, convective airflow around and between the parts can change boundary conditions near the parts in complicated ways that are difficult to model. For example, modeling difficulties arise due to changes in an airflow pattern inside the autoclave or oven, due to a number of parts cured together, due to tool nesting and orientation, due to part geometry, and due to overall thermal mass.

Numerical simulation of part temperature is frequently treated as a one-dimensional (1D) heat transfer problem, where the single dimension corresponds to a thickness of the tool and part. For example, numeric simulation (e.g., finite elements modeling) may use properties of a thermal stack (e.g., boundary conditions $h_1$, $h_2$, a thickness of the part $L_1$, and a thickness of the tool $L_2$) and air temperature (lair) to simulate a 1D thermo-chemical curing process of a composite part to determine part temperature history. While thickness of the part, the thickness of the tool, and the air temperature may be known, the heat transfer boundary conditions $h_1$ and $h_2$, are generally unknown for reasons explained above. A thermocouple under the tool may be used to gather temperature data as a proxy for temperature of the composite part at a particular location. During heating of the composite part, a part temperature initially lags behind the air temperature due to, for example, tool thermal mass, part thermal mass, convective thermal resistance, and conductive thermal resistance. However, after an exothermic curing reaction starts in the composite part, part temperature at the center of the part may be greater than the air temperature. Thus, the reliability of the thermocouple under the tool as a representation of the temperature of the composite part changes throughout the process.

SUMMARY

In a particular implementation, a method includes obtaining sensor data indicating measured temperatures within a heating vessel during a first portion of a heating operation, wherein the sensor data includes tool temperature values and interior temperature values, wherein a tool temperature value represents a temperature measurement of a portion of a tool within the heating vessel and an interior temperature value represents a temperature measurement of ambient conditions within the heating vessel. The method also includes determining a plurality of sets of thermal stack parameters from a plurality of sets of candidate thermal stack parameters, wherein each set of candidate thermal stack parameters is descriptive of a respective configuration of an in-process thermal stack modeled by a first machine learning model to generate one or more estimated tool temperature values, and wherein the in-process thermal stack comprises the tool and a part coupled to the tool. The method also includes determining a temperature profile for a second portion of the heating operation, wherein the temperature profile is determined, via a second machine learning model, based on the plurality of sets of thermal stack parameters and one or more process specifications of the in-process thermal stack.

In a particular implementation, a system includes a memory configured to store instructions and one or more processors configured to obtain sensor data indicating measured temperatures within a heating vessel during a first portion of a heating operation, wherein the sensor data includes tool temperature values and interior temperature values, wherein a tool temperature value represents a temperature measurement of a tool within the heating vessel and an interior temperature value represents a temperature measurement of ambient conditions within the heating vessel. The one or more processors are also configured to determine a plurality of sets of thermal stack parameters, wherein each set of thermal stack parameters is descriptive of a respective configuration of an in-process thermal stack modeled by a first machine learning model to generate the tool temperature values responsive to the interior temperature values, the in-process thermal stack comprising the tool and a part coupled to the tool. The one or more processors are also configured to determine a temperature profile for a second portion of the heating operation, wherein the temperature profile is determined, via a second machine learning model, based on the plurality of sets of thermal stack parameters and one or more process specifications of the in-process thermal stack.

In another particular embodiment, a non-transient, computer-readable medium stores instructions that, when executed by one or more processors, cause the one or more processors to initiate, perform, or control operations including obtaining sensor data indicating measured temperatures within a heating vessel during a first portion of a heating operation, wherein the sensor data includes tool temperature values and interior temperature values, wherein a tool temperature value represents a temperature measurement of a tool within the heating vessel and an interior temperature value represents a temperature measurement of ambient conditions within the heating vessel. The operations also include determining a plurality of sets of thermal stack parameters, wherein each set of thermal stack parameters is descriptive of a respective configuration of an in-process thermal stack modeled by a first machine learning model to generate the tool temperature values responsive to the interior temperature values, the in-process thermal stack comprising the tool and a part coupled to the tool. The operations also include determining a temperature profile for a second portion of the heating operation, wherein the temperature profile is determined, via a second machine learning model, based on the plurality of sets of thermal stack parameters and one or more process specifications of the in-process thermal stack.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 2 is a flow chart of an example of a method for heating operation process control, in accordance with at least one embodiment of the subject disclosure.

FIG. 4A illustrates an example of a neural network for generating one or more estimated tool temperature values, in accordance with at least one embodiment of the subject disclosure.

FIG. 4B illustrates an example classifier neural network for classifying sets of thermal stack parameters based on candidate air temperature profiles and process specifications, in accordance with at least one embodiment of the subject disclosure.

FIG. 6B illustrates an example set of three temperature value functions over the course of an exemplary heating operation, in accordance with at least one embodiment of the subject disclosure.

FIG. 6C illustrates another example set of three temperature value functions over the course of an exemplary heating operation, in accordance with at least one embodiment of the subject disclosure.

DETAILED DESCRIPTION

Figure 1:
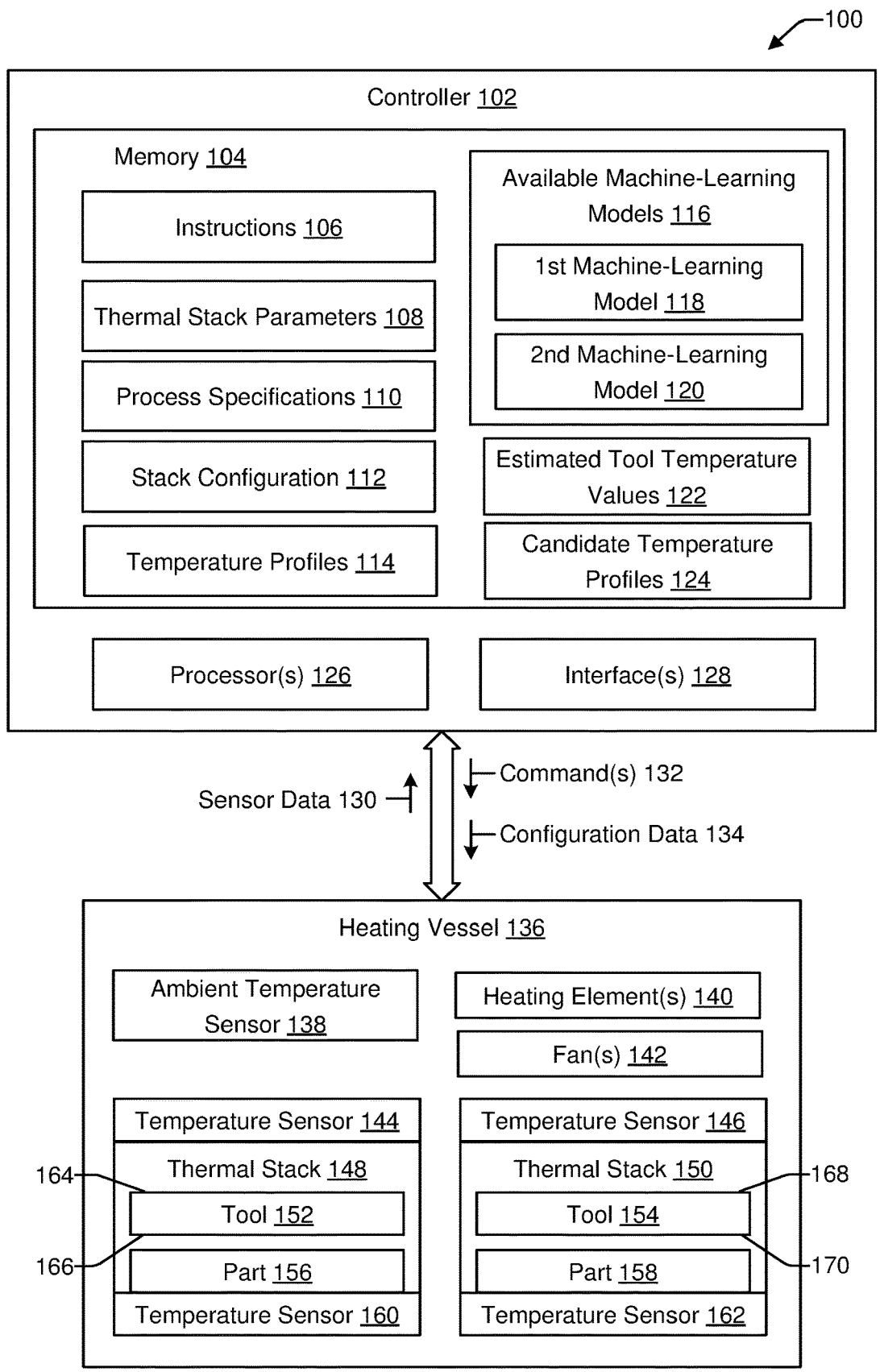
FIG. 1 depicts an example system for heating operation process control, in accordance with at least one embodiment of the subject disclosure.

Aspects disclosed herein use machine learning techniques to solve an inverse heat-transfer problem using tool temperature data from a temperature sensor coupled to a tool, as well as certain boundary conditions associated with the tool and a part coupled to the tool, which can then be used to generate an estimate of tool temperature as a function of time and compared against the tool temperature sensor data and process specification applicable to the specific part. With the speed of simulation in machine-learning models, in cases where the part temperature does not satisfy the process specifications, machine learning can be used to identify the set of heating operation temperature profiles that satisfies all the process specifications. From the set of heating operation temperature profiles that satisfies all the process specifications, one temperature profile can be selected to improve the heating operation. For example, a temperature profile that allows for a faster heating operation than others in the set can be selected. As an additional example, a temperature profile that allows for a smaller difference between the predicted ambient temperature and the predicted part temperature than others in the set can be selected.

The subject disclosure illustrates systems and methods for using data from multiple tool temperature sensors to solve the inverse thermo-chemical problem and identify all potential thermal stacks. A machine-learning framework can then optimize the cure cycle in real-time (or near real-time) to identify the set of heating operation temperature profiles that satisfy all the process specifications. Such a framework can be implemented in industrial settings for active control of processing.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more processors ("processor(s)" 126 in FIG. 1), which indicates that in some implementations the system 100 includes a single processor 126 and in other implementations the system 100 includes multiple processors 126. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example system 100 for heating operation process control, in accordance with at least one embodiment of the subject disclosure. In some implementations, the system 100 includes a controller 102 configured to automatically control a heating operation in a heating vessel 136 via one or more commands 132 and/or configuration data 134.

For example, as described in more detail below with reference to FIGS. 2-7, the system 100 can obtain sensor data 130. In some implementations, the sensor data 130 can include one or more data values, including one or more tool temperature values and one or more interior temperature values. The tool temperature value(s) can represent a temperature measurement of a portion of a tool 152 and/or 154 within the heating vessel 136. For example, the tool temperature value(s) can represent a temperature measurement made by a temperature sensor 144 coupled to a surface 164 and/or 166 of a portion of the tool 152, a temperature sensor 146 coupled to a surface 168 and/or 170 of a tool 154, a temperature sensor 160 coupled to a surface of a part 156, and/or a temperature sensor 162 coupled to a surface of a part 158.

The interior temperature value(s) can represent a temperature measurement of ambient conditions within the heating vessel 136. For example, the interior temperature value(s) can represent a temperature measurement made by one or more ambient temperature sensors 138 coupled to the heating vessel 136.

In some implementations, the heating vessel 136 can be configured to perform one or more heating operations to cure one or more parts 156, 158 coupled to one or more tools 152, 154, as described in more detail below with reference to FIGS. 2-7. For example, the heating vessel 136 can conduct a heating operation that facilitates exothermic curing of one or more materials of the parts 156 and 158. Generally, curing the parts 156 and 158 occurs according to one or more process specifications 110. For example, a particular process can have a limit on maximum part temperature, part temperature rate, etc. Generally, the process specifications 110 are specific to the particular part 156 and/or 158.

To properly cure the parts 156 and/or 158, the heating operation of the heating vessel 136 can include one or more portions or stages. In some implementations, each portion of the heating operation can be conducted in accordance with a temperature profile 114. For example, a temperature profile 114 for the heating operation can include one or more target interior temperature values, one or more target interior temperature change rates, one or more target dwell times associated with a particular target interior temperature value, or some combination thereof.

Figure 5A:
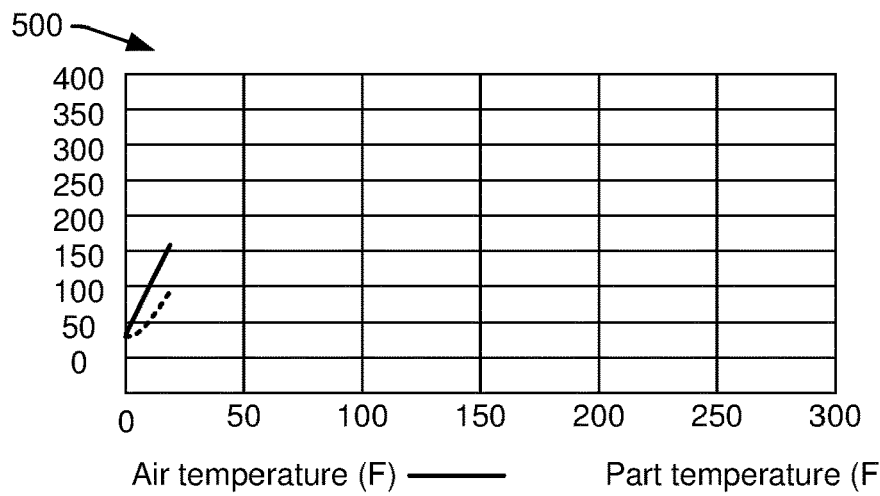
FIG. 5A illustrates an example graph illustrating an exemplary air temperature and an exemplary part temperature during a first portion of the heating operation, in accordance with at least one embodiment of the subject disclosure.

FIG. 5A illustrates an example graph 500 illustrating an exemplary air temperature and an exemplary part temperature during a first portion of the heating operation, in accordance with at least one embodiment of the subject disclosure. Exemplary graph 500 is provided as an illustrative example to aid in understanding and is not intended to limit the scope of the subject disclosure. In FIG. 5A, the air temperature and the part temperature both rise over the course of a first portion of the heating operation. For example, the example graph 500 illustrates the air temperature and the part temperature for the first twenty minutes of a heating operation within the heating vessel 136 of FIG. 1.

The air temperature can be associated with the interior temperature values from the ambient temperature sensor(s) 138 of FIG. 1. The part temperature can be associated with the tool temperature values from the temperature sensor 144 coupled to the tool 152 of FIG. 1.

Referring again to FIG. 1, as described in more detail below with reference to FIGS. 2-7, improving the heating operation can include determining, via a machine-learning model, an appropriate temperature profile 114 for a second portion of the heating operation based on: (1) a plurality of sets of thermal stack parameters 108 determined based on temperature values describing the first portion of the heating operation and (2) the one or more process specifications 110. For example, improving the heating operation can include determining, via a machine-learning model, a temperature profile 114 for the second portion of the heating operation that results in a slower cycle time than would the original temperature profile for the first portion of the heating operation. However, the temperature profile 114 for the second portion of the heating operation would result in a heating operation that meets all of the process specifications.

A set of thermal stack parameters 108 that describes a thermal stack 148, 150 that has begun a heating operation can be referred to as descriptive of an "in-process" thermal stack. The thermal stack parameters 108 can include a plurality of parameter values that describe an in-process thermal stack 148, 150. The thermal stack 148 can include the part 156 coupled to the tool 152, as well as one or more of the temperature sensors 144, 160. The thermal stack 150 can include the part 158 coupled to the tool 154, as well as one or more of the temperature sensors 146, 162. As described in more detail below with reference to FIGS. 2-7, the thermal stack parameters 108 associated with the thermal stack 148 and/or 150 can include, for example, one or more boundary condition values, a value of a thickness of the part 156 and/or 158, a value of the thickness of the tool 152 and/or 154, one or more temperature values associated with the tool 152 and/or 154, or some combination thereof.

Figure 3A:
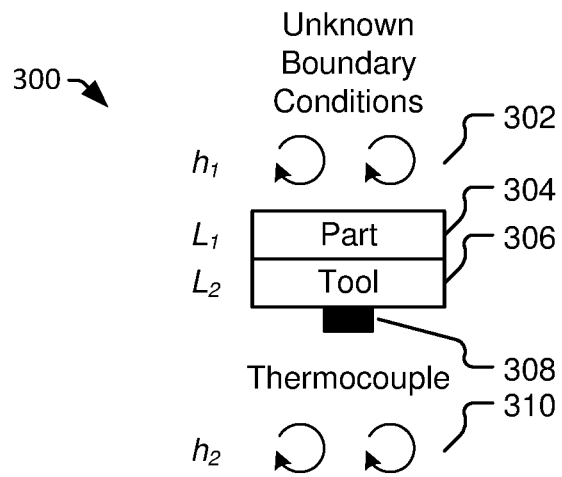
FIG. 3A illustrates an example thermal stack, in accordance with at least one embodiment of the subject disclosure.

FIG. 3A illustrates an example thermal stack 300, in accordance with at least one embodiment of the subject disclosure. FIG. 3A is provided as an illustrative example to aid in understanding and should not be understood to limit the scope of the subject disclosure. In some implementations, the example thermal stack 300 includes a part 304 coupled to a tool 306. The temperature associated with the tool 306 can be measured by a thermocouple 308 coupled to the tool 306. In some implementations, other temperature-measuring devices can be used in place of the thermocouple 308 without departing from the scope of the present disclosure.

In addition to the part 304 coupled to the tool 306, example thermal stack 300 also illustrates a plurality of boundary conditions 302 and 310. Depending on the design of the heating vessel 136 of FIG. 1, geometries of the tool 306 and/or the part 304, and various other factors, convective heat transfer boundary conditions can vary around portions of the part 304 and/or the tool 306. In some implementations, the boundary conditions 302 and 310 of the example thermal stack 300 are unknown. For example, when curing multiple parts 304 within the heating vessel 136 of FIG. 1, the boundary conditions 302 and 310 are generally unknown. In some implementations, the boundary conditions 302 and 310 can generally correspond to a heat transfer coefficient associated with an upper surface of the part 304 and a lower surface of the tool 306, respectively. In the same or alternative implementations, the boundary conditions 302 and 310 can represent other boundary conditions without departing from the scope of the present disclosure.

The example thermal stack 300 illustrates a simplified representation of processing a composite part 304 with a thickness of $L_1$ placed on a tool 306 with a thickness of $L_2$. In the example thermal stack 300, the heat transfer coefficient at the upper surface of the part 304 (e.g., the boundary condition 302) and the heat transfer coefficient at the lower surface of the tool 306 (e.g., the boundary condition 310) are unknown. The thermocouple 308 can be used to monitor the temperature value history of the tool 306.

During heating, the temperature of the part 304 initially lags the ambient temperature within the heating vessel 136 of FIG. 1 due to thermal masses of the part 304 and the tool 306, as well as combined convective and conductive thermal resistances. Once the exothermic curing reaction starts in the part 304, temperature at the center of the part 304 may exotherm beyond the ambient temperature within the heating vessel 136 of FIG. 1, as described in more detail below with reference to FIG. 3B. Improving a heating operation for the part 304 that meets the process specifications can include considering a range of values for the boundary conditions 302 and 310. In the same or alternative implementations, the processor(s) 126 of FIG. 1 can use temperature values from the thermocouple 308 to back calculate one or more of the boundary conditions 302 and 310 using a trial-and-error method.

Figure 3B:
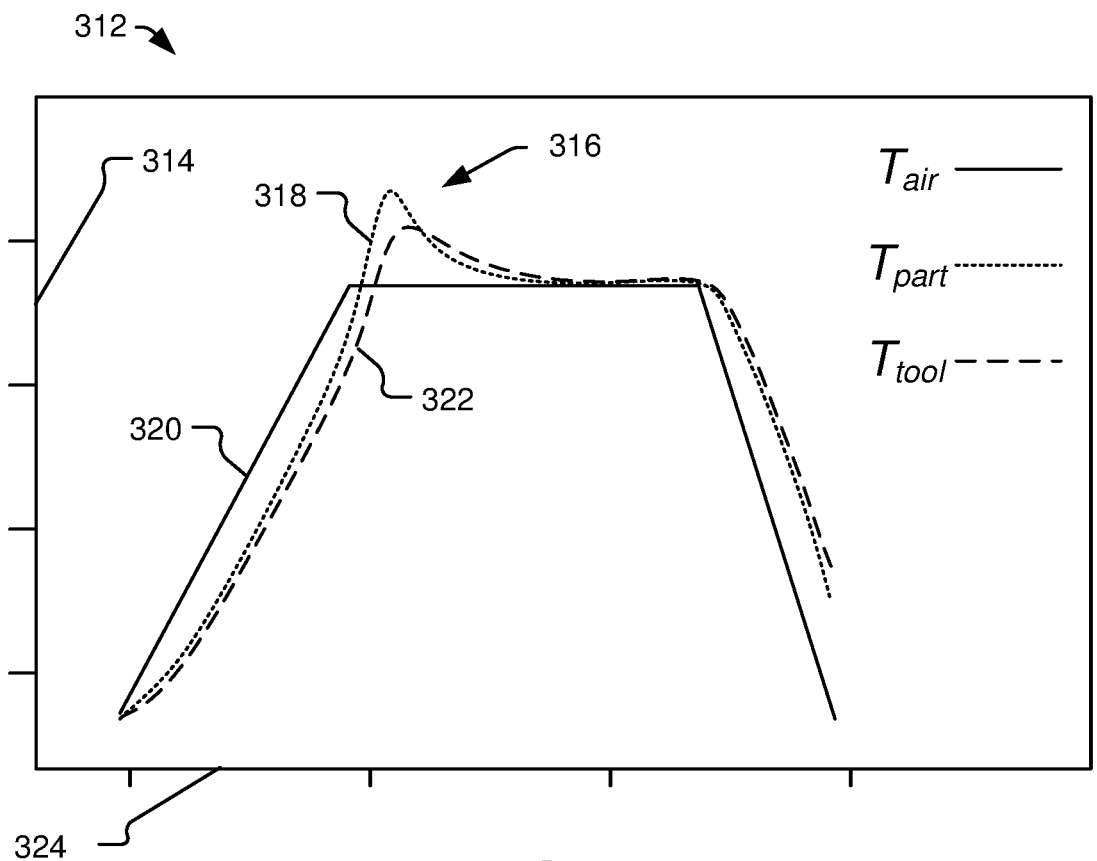
FIG. 3B illustrates an example graph illustrating an example air temperature profile, an example part temperature profile, and an example tool temperature profile, in accordance with at least one embodiment of the subject disclosure.

FIG. 3B illustrates an example graph 312 illustrating an example air temperature profile 320, an example part temperature profile 318, and an example tool temperature profile 322, in accordance with at least one embodiment of the subject disclosure. FIG. 3B is provided as an illustrative example to aid in understanding and should not be understood to limit the scope of the subject disclosure. In FIG. 3B, the example air temperature profile 320 illustrates the ambient temperature within the heating vessel 136 of FIG. 1 ("$T_{air}$"), the example part temperature profile 318 illustrates the temperature of the part 304 of FIG. 3A ("$T_{part}$"), and the example tool temperature profile 322 illustrates the temperature of the tool 306 of FIG. 3A ("$T_{tool}$"). all plotted along a first axis 314, representing temperature and a second axis 324, representing time. FIG. 3B illustrates the temperatures of the part 304 and tool 306 of FIG. 3A exotherm beyond the ambient temperature (e.g., around region 316).

Referring again to FIG. 1, the heating vessel 136 can communicate with the controller 102 to control the heating operation. In some implementations, the heating vessel 136 can communicate a plurality of sensor data 130 to the controller 102 and the heating vessel 136 can receive the command(s) 132 and/or the configuration data 134 from the controller 102. As described in more detail below with reference to FIGS. 2-7, the processor(s) 126 can use the sensor data 130 to generate the command(s) 132 and/or the configuration data 134 to control the heating operation within the heating vessel 136.

In some implementations, the controller 102 includes a memory 104, one or more processors 126, and one or more interfaces 128. The memory 104 can be configured to store a plurality of data, including instructions 106, which, when executed by the processor(s) 126, can perform the various processes described in the subject disclosure.

In some implementations, the memory 104 can also store one or more available machine-learning models 116. As described in more detail below with reference to FIGS. 2-7, the available machine-learning models 116 can be configured to aid the processor(s) 126 in controlling a heating operation of the heating vessel 136. For example, a first machine-learning model 118 can generate one or more estimated tool temperature values. In some configurations, the first machine-learning model 118 can generate an estimate of the tool temperature as a function of time for some or all sets of thermal stack parameters 108. As an additional example, a second machine-learning model 120 can predict whether a pair of a particular one of the temperature profiles 114 and a particular one of the sets of thermal stack parameters 108 will meet the one or more process specifications for a particular part 156.

In some implementations, one or more of the first machine-learning model 118 and/or the second machine-learning model 120 can be selected from among a plurality of available machine-learning models 116. For example, the processor(s) 126 can select a particular first machine-learning model 118 (and/or a particular second machine-learning model 120) based at least on one or more materials of the in-process thermal stack 148. One or more of the available machine-learning models 116 can be specific to a particular material, such as a composite used to form some or all of the part 156. Thus, the processor(s) 126 can select one or more of the available machine-learning models 116 applicable to that particular composite material.

In some implementations, the first machine-learning model 118 can be configured to generate one or more estimated tool temperature values based on input that includes a value of a thickness of the part 156, one or more interior temperature values, and one or more tool temperature values. For example, the first machine-learning model 118 can be a long short-term memory ("LSTM") neural network trained to predict the temperature of the part 156 from the interior temperature values and a set of thermal stack parameters 108. By using an LSTM neural network, the optimization process can be 100-1000 times faster than certain finite element models, enabling an inverse solution to the problem of finding the appropriate temperature profile 114 for the heating operation of the in-process thermal stack 148.

FIG. 4A illustrates an example neural network 400 for generating one or more estimated tool temperature values, in accordance with at least one embodiment of the subject disclosure. In FIG. 4A, the example neural network 400 includes a plurality of inputs 402. Although two inputs 402 are shown in example neural network 400, more, different, or fewer inputs could be used without departing from the scope of the present disclosure. For example, input 402 illustrates an illustrative set of thermal stack parameters "S." In FIG. 4A, S is an nx4 vector with four components: a first heat transfer coefficient associated with a surface of the part 304 of FIG. 3 ("$h_1$"), a value of a thickness of the part 304 ("$L_1$"), a value of a thickness of the tool 306 of FIG. 3 ("$L_2$"), and a second heat transfer coefficient associated with a surface of the tool 306 ("$h_2$"). In some configurations, the input 402 can include different boundary conditions (other than heat transfer coefficients). Further, in some implementations the value of the thickness of the tool 306 can be input from a measurement and/or retrieved from the memory 104 of FIG. 1. For example, the processor(s) 126 can store $L_2$ values from previous estimations in the memory 104.

In FIG. 4A, the example neural network 400 receives the illustrative set of candidate thermal stack parameters "S" for each potentially relevant stack configuration 112 of the in-process thermal stack 148. As described in more detail above with reference to FIGS. 1 and 3, certain portions of the thermal stack parameters 108 (e.g., the boundary conditions 302 and 310 of FIG. 3) can be unknown for a particular in-process thermal stack 148. By providing an incremented range of potential values for each of the unknown components of the stack parameters 108, the processor(s) 126 of FIG. 1 can generate a set of candidate thermal stack parameters.

In some implementations, the processor(s) 126 of FIG. 1 can establish a potential range for the sets of candidate thermal stack parameters based on one or more specified start values, one or more specified step values, and one or more specified stop values. For example, if the boundary conditions 302 and 310 of FIG. 3 are the heat transfer coefficients at the part 304 and the tool 306, respectively, and the boundary conditions 302 and 310 are unknown, the processor(s) 126 of FIG. 1 can establish an incremented range of potential heat transfer coefficient values. An incremented range of potential heat transfer coefficient values can include a specified start value of 20 $W/m^2K$, a specified stop value of 100 $W/m^2K$, and a specified step value of five $W/m^2K$. Beginning at 20 $W/m^2K$ and stepping to 100 $W/m^2K$ every 5 $W/m^2K$ results in a total of seventeen potential values for each heat transfer coefficient. For one part subject to the heating operation, this would result in a total of 256 candidate thermal stack parameters (sixteen values for each of the two unknown boundary conditions that are part of the set of thermal stack parameters). The processor(s) can further be configured to, in some implementations, generate a plurality of sets of candidate thermal stack parameters for each of the part 304 of FIG. 3, for each of multiple cross-sections of the part 304, for each tool 306, for each of multiple cross-sections of the tool 306, or some combination thereof.

Further, in some implementations, the processor(s) 126 of FIG. 1 can communicate one or more interior temperature values representing a temperature measurement of ambient conditions within the heating vessel 136 to the plurality of inputs 402 of the example neural network 400. In some implementations, the one or more interior temperature values can describe an air temperature profile ("$T_{air}$") that can describe the ambient temperature within the heating vessel over a period of time (e.g., the first portion of the heating operation). In some implementations, the interior temperature values can be communicated as a time sequence of the interior temperature values. That is, the one or more interior temperature values can be communicated in the order the temperature values were measured in time, the order the temperature values were received in time, and/or some other appropriate method of identifying a time sequence associated with the ambient temperature within the heating vessel 136 of FIG. 1. The processor(s) can also communicate one or more tool temperature values representing a temperature measurement of a portion of the tool 152 of FIG. 1 within the heating vessel 136.

In FIG. 4A, an exemplary set of candidate thermal stack parameters ("$S[h_1, L_2, h_2]$") is input to the plurality of inputs 402 of the example neural network 400. The plurality of inputs 402 feed the set of candidate thermal stack parameters to a plurality of hidden units 404, which process the candidate thermal stack parameters according to a machine learning algorithm, for example, the example neural network 400 can implement the python-based machine-learning software developed at the University of Washington, "Composites Machine Learning," or "CompML." In some implementations of the example neural network 400, the example neural network 400 can be trained using certain known training methods. For example, a heating operation for curing the HEXCEL AS4/8552 composite on an Invar tool can be trained using the "Tensorflow" library in Python 3.6.8.

In some implementations, the example neural network 400 can predict a plurality of temperature values representing a temperature of the tool 306 of FIG. 3 for each combination of the air temperature profile and one of the set of candidate thermal stack parameters. In some implementations, the predicted plurality of temperature values can describe an estimated tool temperature value for the tool 306 of FIG. 3 as a function of time ("$T_{tool}(t)_n$").

In the same or alternative embodiments, the example neural network 400 can predict a plurality of estimated part temperature values representing a temperature of the part 304 of FIG. 3 for each combination of the air temperature profile and one of the set of candidate thermal stack parameters. In some implementations, the predicted plurality of temperature values can describe a predicted temperature of the part 304 of FIG. 3 as a function of time ("$T_{part}(t)_n$"). In FIG. 4A, one or more of $T_{part}(t)_n$ and/or $T_{tool}(t)_n$ can be communicated to one or more outputs 406 of the example neural network 400. The predicted temperature function(s) can then be communicated to the controller 102 of FIG. 1 for further processing.

Referring again to FIG. 1, the processor(s) 126 can use the predicted temperature function(s) from the first machine-learning model 118 to select one or more sets of thermal stack parameters 108 from among the set of candidate thermal stack parameters. For example, the processor(s) 126 can compare the predicted tool temperature function to the obtained tool temperature values to determine which of the candidate thermal stack parameters resulted in predicted tool temperature functions that best match the obtained tool temperature values. The processor(s) 126 can select one or more sets of thermal stack parameters 108 from the plurality of sets of candidate thermal stack parameters.

Figure 5B:
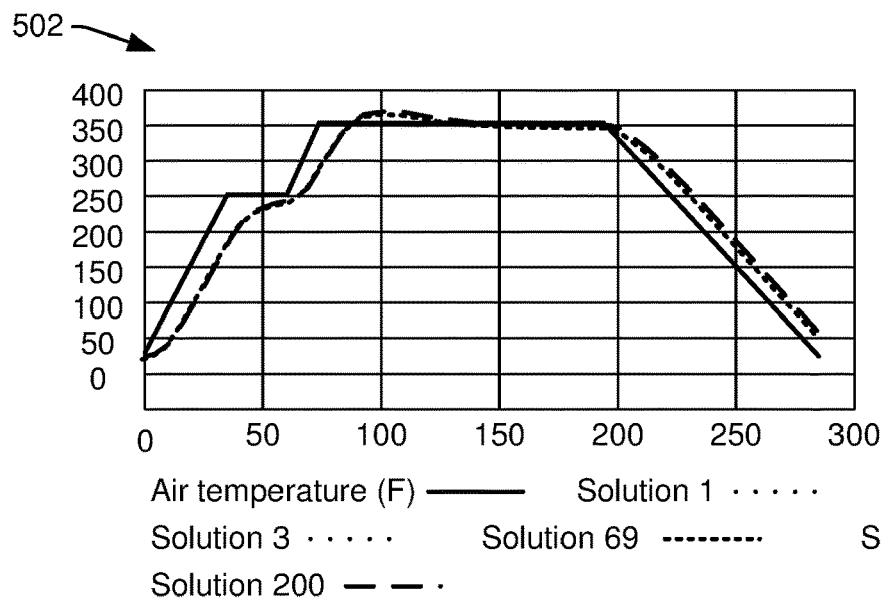
FIG. 5B illustrates an example graph illustrating an exemplary air temperature profile and a plurality of predicted part temperatures, in accordance with at least one embodiment of the subject disclosure.

FIG. 5B illustrates an example graph 502 illustrating an exemplary air temperature profile and a plurality of predicted part temperatures, in accordance with at least one embodiment of the subject disclosure. Example graph 502 is provided as an illustrative example to aid in understanding and is not intended to limit the scope of the subject disclosure. In FIG. 5B, each of the plurality of predicted part temperatures corresponds to one of the predicted part temperature functions, each of which is associated with one or more of the sets of candidate thermal stack parameters, as described in more detail above with reference to FIG. 4A. In FIG. 5B, the plurality of predicted part temperatures are associated with the selected sets of thermal stack parameters that most closely match the historical tool temperature data values (e.g., the exemplary part temperature of FIG. 5A).

Referring again to FIG. 1, the controller 102 can use the sets of thermal stack parameters 108 along with a plurality of candidate air temperature profiles 124 to improve a second portion of the heating operation of the heating vessel 136. In some implementations, the processor(s) 126 can, via the second machine-learning model 120, determine which of the candidate temperature profiles 124 are predicted to meet all of the process specifications for the heating operation, based on the sets of thermal stack parameters 108 and the process specifications 110, as described in more detail below with reference to FIGS. 2-7.

In some implementations, the processor(s) 126 can generate the candidate temperature profiles 124 from a range of values of the various components of an air temperature profile. For example, an air temperature profile can include one or more target interior temperature values, one or more interior temperature change rates, one or more dwell times associated with a particular target interior temperature value, or a combination thereof. Each of the various components of the air temperature profile can be modeled by a range of values to generate the candidate temperature profiles 124. As an illustrative example, an air temperature profile can include values within a first range of target interior temperature values from 230-260 degrees Fahrenheit, a second range of target interior temperature values from 325-375 degrees Fahrenheit, a first range of interior temperature change rates from three to five degrees Fahrenheit per second, a second range of interior temperature change rates from eight to eleven degrees Fahrenheit per second, a first range of dwell times from 25-50 seconds, a second range of dwell times from 120-150 seconds, or a combination thereof.

Further, exemplary air temperature profiles may include values within one or more ranges of target interior temperature values, interior temperature change rates, and/or dwell times that vary at one or more increments. As an illustrative example, a set of exemplary air temperature profiles can include values that step through the range of target interior temperature values at in increment of 0.5 degrees Fahrenheit, the range of interior temperature change rates at an increment of 0.1 degrees Fahrenheit per second, and/or the range of dwell times at an increment of five seconds. In some configurations, the set of candidate temperature profiles 124 can be limited to the candidate temperature profiles 124 that best match the actual historical air temperature data obtained from the ambient temperature sensor 138.

In some implementations, the second machine-learning model 120 can classify each pair of a set of thermal stack parameters and a candidate air temperature profile as either passing or failing each of the process specifications 110. In the same or alternative implementations, the second machine-learning model 120 can classify each pair of a set of thermal stack parameters and a candidate air temperature profile into more or different categories without departing from the scope of the subject disclosure. For example, the second machine-learning model 120 can classify each pair into three or more categories such as "fail," "meet," and "exceed."

FIG. 4B illustrates an example classifier neural network 412 for classifying sets of thermal stack parameters based on candidate air temperature profiles and process specifications, in accordance with at least one embodiment of the subject disclosure. For example, the example neural network 412 can classify the sets of thermal stack parameters 108 of FIG. 1 based on the candidate air temperature profiles 124 and the process specifications 110 of FIG. 1.

In FIG. 4B, the example neural network 412 includes a plurality of inputs 408. Although two inputs 408 are shown in example neural network 412, more, different, or fewer inputs could be used without departing from the scope of the present disclosure. For example, input 408 illustrates an illustrative set of thermal stack parameters "S" that has been selected from the set of candidate thermal stack parameters, as described in more detail above with reference to FIG. 4A. In FIG. 4B, S is an nx4 vector with four components: a first heat transfer coefficient associated with a surface of the part 304 of FIG. 3 ("$h_1$"), a value of a thickness of the part 304 ("$L_1$"), a value of a thickness of the tool 306 of FIG. 3 ("$L_2$"), and a second heat transfer coefficient associated with a surface of the tool 306 ("$h_2$"). In some configurations, the first input can include different boundary conditions (other than heat transfer coefficients). Further, in some implementations the value of the thickness of the tool 306 can be input from a measurement and/or retrieved from the memory 104 of FIG. 1. For example, the processor(s) 126 can store $L_2$ values from previous estimations in the memory 104.

In some configurations, the input 408 can include one or more candidate air temperature profiles ("$T_{air}$[ramps, holds]$_m$"), e.g., the candidate air temperature profiles 124 of FIG. 1. Each candidate air temperature profile can describe the ambient temperature within the heating vessel over a period of time (e.g., the second portion of the heating operation). The inputs 408 feed the candidate air temperature profiles and the sets of thermal stack parameters to a plurality of hidden units 410, which process the candidate thermal stack parameters according to a machine learning algorithm. For example, the example neural network 412 can implement the python-based machine-learning software developed at the University of Washington, "Composites Machine Learning," or "CompML." In some implementations of the example neural network 412, the example neural network 412 can be trained using certain known training methods. For example, a heating operation for curing the HEXCEL AS4/8552 composite on an Invar tool can be trained using the "Tensorflow" library in Python 3.6.8.

In some implementations, the example neural network 412 can classify each pair of a set of thermal stack parameters and a candidate air temperature profile according to whether the pair satisfies or fails one or more process specifications, e.g., the process specifications 110 of FIG. 1. As described in more detail above with reference to FIG. 1, in some implementations the heating operation may include a plurality of parts 156, 158 and tools 152, 154 within the heating vessel 136. In such implementations, the example neural network 412 can classify each pair of a set of thermal stack parameters and a candidate air temperature profile according to whether the pair satisfies or fails one or more process specifications for all of the parts 156, 158 within the heating vessel 136 of FIG. 1.

In some implementations, the pairs of thermal stack parameters and candidate air temperature profiles that satisfy all of the one or more process specifications can be communicated to one or more outputs 414 of the example neural network 400. The pair(s) can then be communicated to the controller 102 of FIG. 1 for further processing.

Referring again to FIG. 1, the processor(s) 126 can use the pair(s) of thermal stack parameters and candidate air temperature profiles to optimize a second portion of the heating operation of the heating vessel 136. For example, the processor(s) 126 can select predicted temperature function(s) from the first machine-learning model 118 to select one or more sets of thermal stack parameters 108 from among the set of candidate thermal stack parameters. For example, the processor(s) 126 can compare the predicted tool temperature function to the obtained tool temperature values to determine which of the candidate thermal stack parameters resulted in predicted tool temperature functions that best match the obtained tool temperature values. The processor(s) 126 can select one or more air temperature profiles 114 from among the candidate air temperature profiles 124 based on one or more selection criteria. For example, the processor(s) 126 can select the air temperature profiles 114 that have the shortest time duration while predicted to meet all process specifications for the heating operation.

In some implementations, the controller 102 can use the selected air temperature profiles 114 to change one or more operating parameters of the heating vessel 136. For example, the controller 102 can send one or more commands 132 and/or configuration data 134 to the heating vessel to modify one or more components of the heating operation of the heating vessel 136.

Figure 5C:
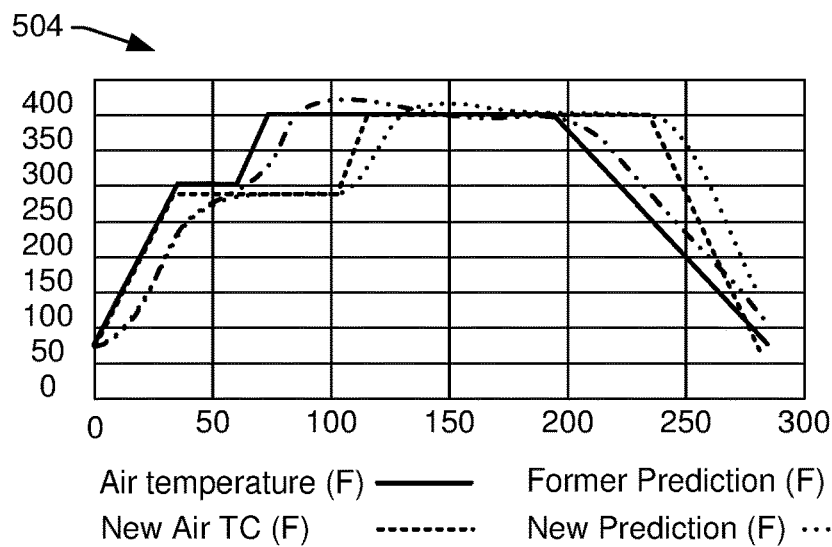
FIG. 5C illustrates an example graph illustrating an exemplary air temperature profile, an exemplary predicted part temperature, an exemplary new air temperature profile, and an exemplary new predicted part temperature, in accordance with at least one embodiment of the subject disclosure.

FIG. 5C illustrates an example graph 504 illustrating an exemplary air temperature profile, an exemplary predicted part temperature, an exemplary new air temperature profile, and an exemplary new predicted part temperature, in accordance with at least one embodiment of the subject disclosure. Example graph 504 is provided as an illustrative example to aid in understanding and is not intended to limit the scope of the subject disclosure. In FIG. 5C, the predicted part temperature generally corresponds to one of the plurality of predicted part temperatures of FIG. 5B. In some implementations, the exemplary air temperature profile illustrates a pre-optimized air temperature profile utilized during a first portion of a heating operation of the heating vessel 136 of FIG. 1 In FIG. 5C, the predicted part temperature rises above the air temperature profile shortly after the air temperature profile gets to four hundred degrees. In some exemplary configurations, if the predicted part temperature's rise above four hundred degrees violates one or more process specifications for the part (e.g., the process specifications 110 for the part 156 of FIG. 1), the heating operation can be optimized to allow all of the process specifications to be met.

For example, as described in more detail above, the processor(s) 126 of FIG. 1 can determine a temperature profile 114 for a second portion of the heating operation, wherein the temperature profile 114 is determined, via the second machine-learning model 120, based on the plurality of sets of thermal stack parameters 108 and one or more process specifications 110 of the in-process thermal stack 148. In FIG. 5C, the exemplary new air temperature profile generally corresponds to the temperature profile selected for optimization of the second portion of the heating operation. The exemplary new predicted part temperature generally corresponds to a forward-looking model for an estimate of the part temperature according to the exemplary new air temperature profile. In some implementations, the exemplary new air temperature profile can allow for curing of a part in accordance with all process specifications for that part.

As noted above with reference to FIG. 1, in some implementations, the heating operation of the heating vessel 136 can include a plurality of parts 156, 158. In such implementations, optimizing the heating operation of the heating vessel 136 can include ensuring that all of the process specifications 110 for all of the parts 156, 158 are met.

Figure 6A:
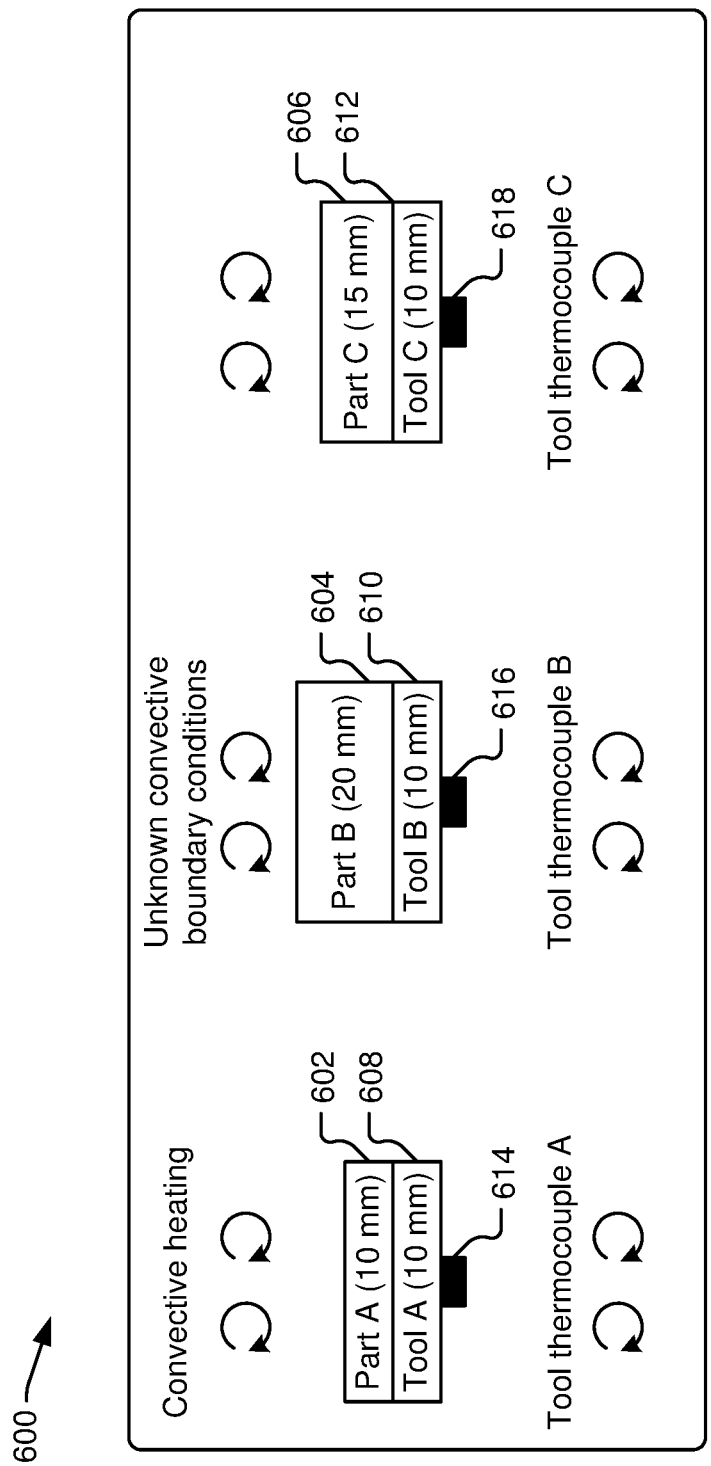
FIG. 6A illustrates an example set of three parts subjected to an exemplary heating operation, in accordance with at least one embodiment of the subject disclosure.
Figure 6D:
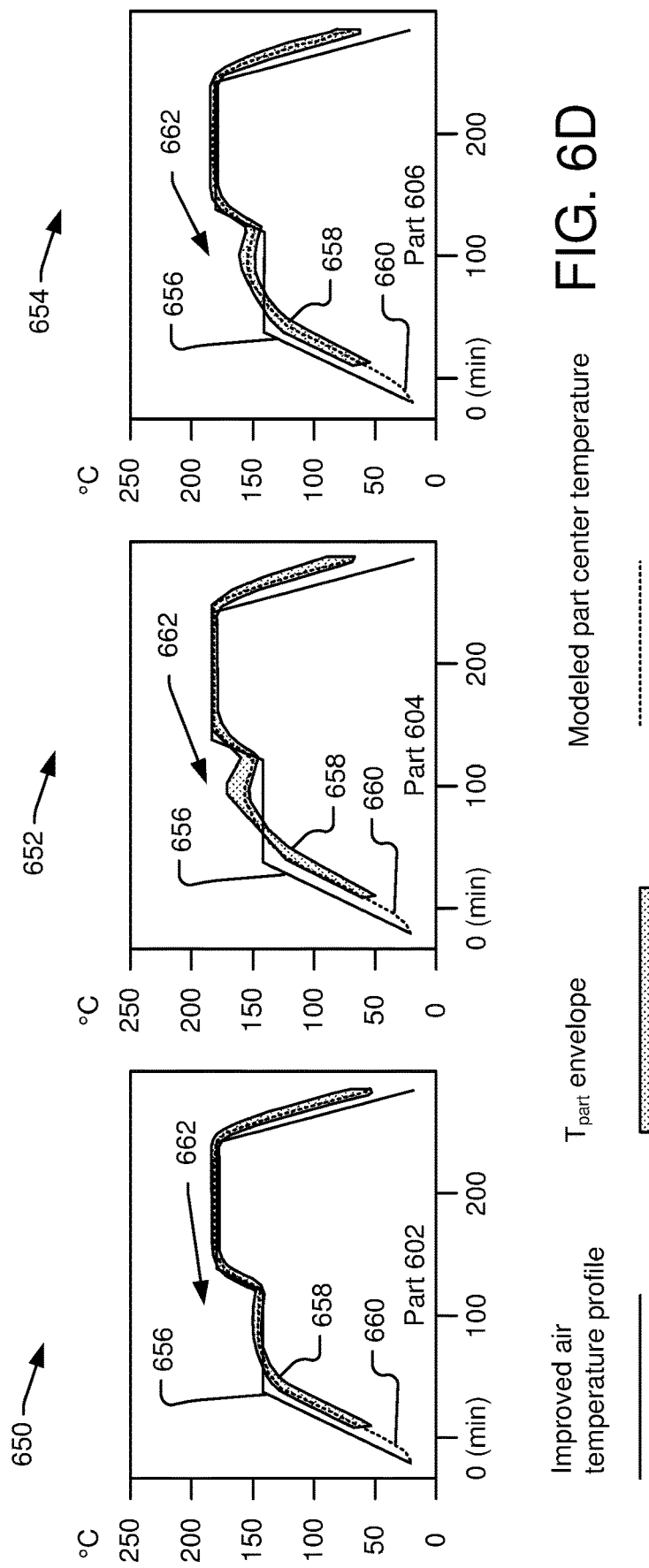
FIG. 6D illustrates another example set of three temperature value functions over the course of an exemplary heating operation, in accordance with at least one embodiment of the subject disclosure.

FIG. 6A illustrates an example set 600 of three parts 602, 604, and 606 subjected to an exemplary heating operation, in accordance with at least one embodiment of the subject disclosure. FIG. 6A is provided as an example to aid in understanding and should not be understood to limit the scope of the subject disclosure. In FIG. 6, the parts 602, 604, and 606 are labeled as "Part A," "Part B," and "Part C," respectively. As described in more detail above with reference to FIG. 1, the parts 602, 604, and 606 are coupled to tools 608, 610, and 612, respectively. The tools 608, 610, and 612 are coupled to temperature sensors 614, 616, and 618, respectively. In FIG. 6A, part 602 (e.g., Part A) has a thickness of ten millimeters, part 604 (e.g., Part B) has a thickness of twenty millimeters, and part 606 (e.g., Part C) has a thickness of fifteen millimeters. Each of the tools 608, 610, 612 has a thickness of ten millimeters. As described in more detail above with reference to FIGS. 1 and 4A, the first machine-learning model 118 of FIG. 1 can use candidate thermal stack parameters based on the part and/or tool thicknesses of the parts 602, 604, and 606 to generate an estimated tool temperature function for each of the parts 602, 604, and 606. The processor(s) 126 of FIG. 1 can then use the estimated tool temperature functions to select one or more sets of thermal stack parameters 108 that best match the historical tool temperature data values from the temperature sensors 614, 616, and 618. As described in more detail above with reference to FIGS. 1 and 4B, the second machine-learning model 120 of FIG. 1 can use the thermal stack parameters 108 and a plurality of candidate air temperature profiles 124 to select an air temperature profile 114 for improving a second portion of the heating operation. FIGS. 6B-6D illustrate how improving the heating operation for multiple parts 602, 604, and 606 can affect the temperature profile used by the heating vessel 136 of FIG. 1.

FIG. 6B illustrates three example sets 620, 630, 640 of an air temperature function 624, a tool temperature function 626, and a part temperature function 628 for the example parts 602, 604, 606 during an exemplary heating operation, in accordance with at least one embodiment of the subject disclosure. The example sets 620, 630, 640 are provided to aid in understanding and are not intended to limit the scope of the subject disclosure.

In FIG. 6B, the example set 620 includes three temperature value functions 624, 626, 628 for the part 602 during an exemplary heating operation. In FIG. 6B, the temperature value function 624 shows the temperature over time for the ambient temperature within the heating vessel 136 of FIG. 1 using an initial air temperature profile for the first portion of the exemplary heating operation. In FIG. 6B, the temperature value function 626 shows the predicted temperature over time for the tool 608 (e.g., $T_{tool}$) coupled to the part 602. In FIG. 6B, the temperature value function 628 shows the predicted temperature over time for the part 602 (e.g., $T_{part}$). In the example set 620, the temperature value functions 626, 628 for the tool 608 and the part 602, respectively, spike shortly after the temperature value function 624 (e.g., at region 629). In some configurations, the spike at region 629 can violate one or more process specifications associated with the part 602.

In FIG. 6B, the example set 630 includes three temperature value functions 624, 626, 628 for the part 604 during an exemplary heating operation. In FIG. 6B, the temperature value function 624 shows the temperature over time for the ambient temperature within the heating vessel 136 of FIG. 1 using an initial air temperature profile for the first portion of the exemplary heating operation. In FIG. 6B, the temperature value function 626 shows the predicted temperature over time for the tool 610 (e.g., $T_{tool}$) coupled to the part 604. In FIG. 6B, the temperature value function 628 shows the predicted temperature over time for the part 604 (e.g., $T_{part}$). In the example set 630, the temperature value functions 626, 628 for the tool 610 and the part 604, respectively, spike shortly after the temperature value function 624 (e.g., at region 629). In some configurations, the spike at region 629 can violate one or more process specifications associated with the part 604.

In FIG. 6B, the example set 640 includes three temperature value functions 624, 626, 628 for the part 606 during an exemplary heating operation. In FIG. 6B, the temperature value function 624 shows the temperature over time for the ambient temperature within the heating vessel 136 of FIG. 1 using an initial air temperature profile for the first portion of the exemplary heating operation. In FIG. 6B, the temperature value function 626 shows the predicted temperature over time for the tool 612 (e.g., $T_{tool}$) coupled to the part 606. In FIG. 6B, the temperature value function 628 shows the predicted temperature over time for the part 606 (e.g., $T_{part}$). In the example set 640, the temperature value functions 626, 628 for the tool 612 and the part 606, respectively, spike shortly after the temperature value function 624 (e.g., at region 629). In some configurations, the spike at region 629 can violate one or more process specifications associated with the part 606.

FIG. 6B illustrates how the initial air temperature profile for an exemplary heating operation can violate one or more process specifications for one or more of the parts 602, 604, 606. FIGS. 6C-6D below illustrate how altering the air temperature profile for the heating operation can prevent violating the one or more process specifications.

FIG. 6C illustrates three example sets 622, 632, 642 showing predicted part temperature functions for some or all of the candidate thermal stack parameters using an initial air temperature profile, in accordance with at least one embodiment of the subject disclosure. The example sets 622, 632, 642 are provided to aid in understanding and are not intended to limit the scope of the subject disclosure. FIG. 6C illustrates exemplary part temperature functions associated with a set of candidate thermal stack parameters, as described in more detail above with reference to FIGS. 1-2 and 4A.

In FIG. 6C, the example set 622 includes three temperature value functions 624, 636, 638 for the part 602 during an exemplary heating operation. In FIG. 6C, the temperature value function 624 shows the temperature over time for the ambient temperature within the heating vessel 136 of FIG. 1 using an initial air temperature profile for the first portion of the exemplary heating operation. In FIG. 6C, the temperature value function 636 shows an envelope containing the predicted part temperature functions for the candidate thermal stacks based on the historical tool temperature data values for the part 602 gathered during the first portion of the exemplary heating operation. For example, the temperature value function 636 can illustrate the output of the first machine-learning model 118 of FIG. 1, as described in more detail above with reference to FIGS. 1-2 and 4A. In FIG. 6C, the temperature value function 638 shows an illustrative model of the tool temperature function for the part 602 using a finite-element analysis, which can be used to validate the temperature value function 636.

In FIG. 6C, the example set 632 includes three temperature value functions 624, 636, 638 for the part 604 during an exemplary heating operation. In FIG. 6C, the temperature value function 624 shows the temperature over time for the ambient temperature within the heating vessel 136 of FIG. 1 using an initial air temperature profile for the first portion of the exemplary heating operation. In FIG. 6C, the temperature value function 636 shows an envelope containing the predicted part temperature functions for the candidate thermal stacks based on the historical tool temperature data values for the part 604 gathered during the first portion of the exemplary heating operation. For example, the temperature value function 636 can illustrate the output of the first machine-learning model 118 of FIG. 1, as described in more detail above with reference to FIGS. 1-2 and 4A. In FIG. 6C, the temperature value function 638 shows an illustrative model of the tool temperature function for the part 604 using a finite-element analysis, which can be used to validate the temperature value function 636.

In FIG. 6C, the example set 642 includes three temperature value functions 624, 636, 638 for the part 606 during an exemplary heating operation. In FIG. 6C, the temperature value function 624 shows the temperature over time for the ambient temperature within the heating vessel 136 of FIG. 1 using an initial air temperature profile for the first portion of the exemplary heating operation. In FIG. 6C, the temperature value function 636 shows an envelope containing the predicted part temperature functions for the candidate thermal stacks based on the historical tool temperature data values for the part 606 gathered during the first portion of the exemplary heating operation. For example, the temperature value function 636 can illustrate the output of the first machine-learning model 118 of FIG. 1, as described in more detail above with reference to FIGS. 1-2 and 4A. In FIG. 6C, the temperature value function 638 shows an illustrative model of the tool temperature function for the part 606 using a finite-element analysis, which can be used to validate the temperature value function 636.

As was illustrated in FIG. 6B above, the example sets 622, 632, 642 show the temperature value function 636 spiking above the highest value of the temperature value function 624 around the area 634. In the exemplary area 634 the process specifications for the parts 602, 604, 606 can be violated by the part temperature functions illustrated within the part temperature value function 636. FIG. 6D below illustrates how the part temperature functions illustrated within the part temperature value function 636 can satisfy the process specifications for the parts 602, 604, 606 under a different, improved air temperature profile.

FIG. 6D illustrates three example sets 650, 652, 654 showing predicted part temperature functions for some or all of the candidate thermal stack parameters using an improved air temperature profile, in accordance with at least one embodiment of the subject disclosure. The example sets 650, 652, 654 are provided to aid in understanding and are not intended to limit the scope of the subject disclosure. FIG. 6D illustrates exemplary part temperature functions associated with a set of candidate thermal stack parameters using an improved air temperature profile (e.g., a temperature profile 114 of FIG. 1), as described in more detail above with reference to FIGS. 1-2 and 4A-4B.

In FIG. 6D, the example set 650 includes three temperature value functions 656, 658, 660 for the part 602 during an exemplary heating operation. In FIG. 6D, the temperature value function 656 shows the temperature over time for the ambient temperature within the heating vessel 136 of FIG. 1 using an improved air temperature profile for a second portion of the exemplary heating operation. In FIG. 6D, the temperature value function 658 shows an envelope containing the predicted part temperature functions for the selected thermal stack parameters for the part 602. In FIG. 6D, the temperature value function 660 shows an illustrative model of the tool temperature function for the part 602 using a finite-element analysis, which can be used to validate the temperature value function 658.

In FIG. 6D, the example set 652 includes three temperature value functions 656, 658, 660 for the part 604 during an exemplary heating operation. In FIG. 6D, the temperature value function 656 shows the temperature over time for the ambient temperature within the heating vessel 136 of FIG. 1 using an improved air temperature profile for a second portion of the exemplary heating operation. In FIG. 6D, the temperature value function 658 shows an envelope containing the predicted part temperature functions for the selected thermal stack parameters for the part 604. In FIG. 6D, the temperature value function 660 shows an illustrative model of the tool temperature function for the part 604 using a finite-element analysis, which can be used to validate the temperature value function 658.

In FIG. 6D, the example set 654 includes three temperature value functions 656, 658, 660 for the part 606 during an exemplary heating operation. In FIG. 6D, the temperature value function 656 shows the temperature over time for the ambient temperature within the heating vessel 136 of FIG. 1 using an improved air temperature profile for a second portion of the exemplary heating operation. In FIG. 6D, the temperature value function 658 shows an envelope containing the predicted part temperature functions for the selected thermal stack parameters for the part 606. In FIG. 6D, the temperature value function 660 shows an illustrative model of the tool temperature function for the part 606 using a finite-element analysis, which can be used to validate the temperature value function 658.

FIG. 6D illustrates how the selected thermal stack parameters, when used in a heating operation under an improved air temperature profile 656 do not violate one or more process specifications for the parts 602, 604, and 606. For example, the area 662 illustrated in the sets 650, 652, and 654 show a spike where the part temperature exceeds the air temperature. However, as the improved air temperature profile does not raise immediately to its maximum value, the temperature spike at the area 662 does not exceed a maximum part temperature for the parts 602, 604, 606.

Referring again to FIG. 1, in some implementations the system 100 may also include one or more heating elements 140 and/or one or more fans 142 in order to control the heating operation within the heating vessel 136. In some implementations, the command(s) 132 and/or the configuration data 134 can be used by the heating vessel 136 to control one or more operational parameters of the heating element(s) 140 and/or the fan(s) 142.

FIG. 2 is a flow chart of an example of a method 200 for heating operation process control, in accordance with at least one embodiment of the subject disclosure. The method 200 may be initiated, performed, or controlled by one or more processors executing instructions, such as by the processor(s) 126 of FIG. 1 executing the instructions 106 from the memory 104.

In some embodiments, the method 200 includes, at 202, obtaining sensor data indicating measured temperatures within a heating vessel during a first portion of a heating operation, wherein the sensor data includes tool temperature values and interior temperature values, wherein a tool temperature value represents a temperature measurement of a portion of a tool within the heating vessel and an interior temperature value represents a temperature measurement of ambient conditions within the heating vessel. For example, the processor(s) 126 of FIG. 1 can obtain the sensor data 130 indicating measured temperatures within the heating vessel 136 during a first portion of a heating operation. The temperature measurement of a portion of the tool 152 within the heating vessel 136 can be done by the temperature sensor 144, and the temperature measurement of ambient conditions can be done by the ambient temperature sensor 138.

In the example of FIG. 2, the method 200 also includes, at 204, determining a plurality of sets of thermal stack parameters from a plurality of sets of candidate thermal stack parameters, wherein each set of candidate thermal stack parameters is descriptive of a respective configuration of an in-process thermal stack modeled by a first machine-learning model to generate one or more estimated tool temperature values, and wherein the in-process thermal stack comprises the tool and a part coupled to the tool. For example, as described in more detail above with reference to FIGS. 1 and 4A, the processor(s) 126 of FIG. 1 can determine the sets of thermal stack parameters 108 from a set of candidate thermal stack parameters modeled by the first machine-learning model 118.

In the example of FIG. 2, the method 200 also includes, at 206, determining a temperature profile for a second portion of the heating operation, wherein the temperature profile is determined, via a second machine-learning model, based on the plurality of sets of thermal stack parameters and one or more process specifications of the in-process thermal stack. For example, as described in more detail above with reference to FIGS. 1 and 4B, the processor(s) 126 of FIG. 1 can determine, via the second machine-learning model 120, the temperature profile 114 based on the thermal stack parameters 108 and the process specifications 110 of the in-process thermal stack 148.

Although the method 200 is illustrated as including a certain number of steps, more, fewer, and/or different steps can be included in the method 200 without departing from the scope of the present disclosure. For example, the method 200 can vary depending on the particular material(s) from which the one or more parts 156, 158 of FIG. 1 and/or the one or more tools 152, 154 are formed.

Figure 7:
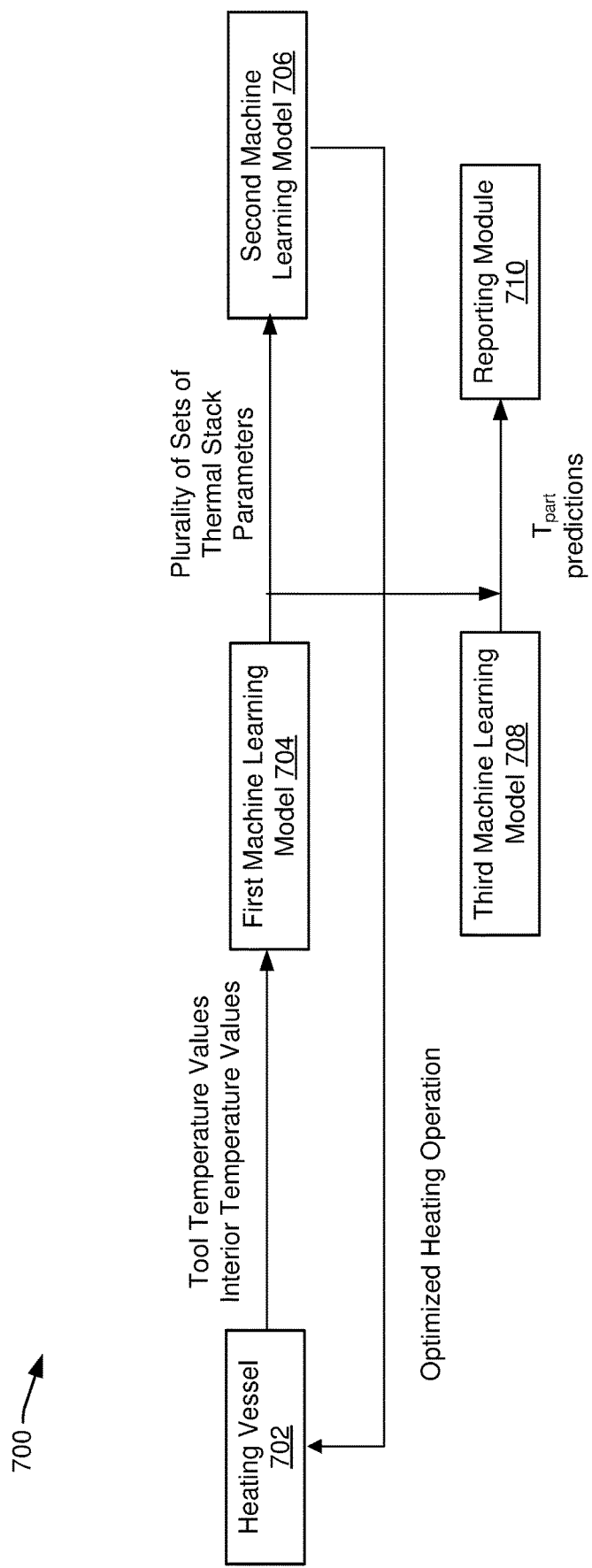
FIG. 7 is an example system for controlling a heating operation of a heating vessel, in accordance with at least one embodiment of the present disclosure.

FIG. 7 is an example system 700 for controlling a heating operation of a heating vessel, in accordance with at least one embodiment of the present disclosure. In some implementations, the example system 700 includes a heating vessel 702 communicatively coupled to a first machine-learning model 704. The heating vessel 702 generally corresponds to the heating vessel 136 of FIG. 1. For example, the heating vessel 702 can be an autoclave or oven. The first machine-learning model 704 generally corresponds to the first machine-learning model 118 of FIG. 1. As described in more detail above with reference to FIG. 1, the heating vessel 136 can communicate tool temperature values and interior temperature values to the first machine learning model 704.

The example system 700 can also include a second machine-learning model 706 communicatively coupled to the first machine-learning model 704. Generally, the second machine-learning model 706 corresponds to the second machine-learning model 120 of FIG. 1. As described in more detail above with reference to FIG. 1, the first machine-learning model 704 can communicate a plurality of sets of thermal stack parameters to the second machine learning model 706. Further, the second machine-learning model 706 can be communicatively coupled to the heating vessel 702. In some implementations, the second machine-learning model can communicate certain data values indicating certain parameters of an optimized heating operation.

The example system 700 can also include a third machine-learning model 708 communicatively coupled to the first machine learning model 704 and communicatively coupled to a reporting module 710. The third machine learning model 708 generally corresponds to another instance of the first machine-learning model 704. For example, the processor(s) 126 of FIG. 1 can select another machine-learning model from among the available machine-learning models 116 for processing other than the processing assigned to the first machine-learning model 118. As an illustrative example, the third machine-learning model 708 can generate one or more estimated part temperature value functions while the first machine-learning model 704 is generating one or more estimated tool temperature value functions. Further, the third machine learning model 708 can communicate the estimated part temperature value functions to the reporting module 710.

In some implementations, the reporting module 710 can be implemented as instructions residing in memory and executable by a processor to report some or all of the results output by the third machine-learning model 708 to one or more other system(s), component(s), and/or user(s). The reporting module 710 can be resident within the memory 104 of FIG. 1 and executable by the processor(s) 126. In the same or alternative implementations, the reporting module 710 can be resident in another controller 102, the heating vessel 136, and/or another computing device 810, as described in more detail below with reference to FIG. 8.

Although the example components of the example system 700 illustrate the heating vessel 702, the first machine-learning model 704, the second machine-learning model 706, the third machine-learning model 708, and the reporting module 710 as distinct components, in some implementations of the example system 700, one or more of the heating vessel 702, the first machine-learning model 704, the second machine-learning model 706, the third machine-learning model 708, and the reporting module 710 can reside locally and/or remotely from one another. Further, one or more of the heating vessel 702, the first machine-learning model 704, the second machine-learning model 706, the third machine-learning model 708, and the reporting module 710 can reside within one computing device and/or can be distributed among a plurality of computing devices.

Figure 8:
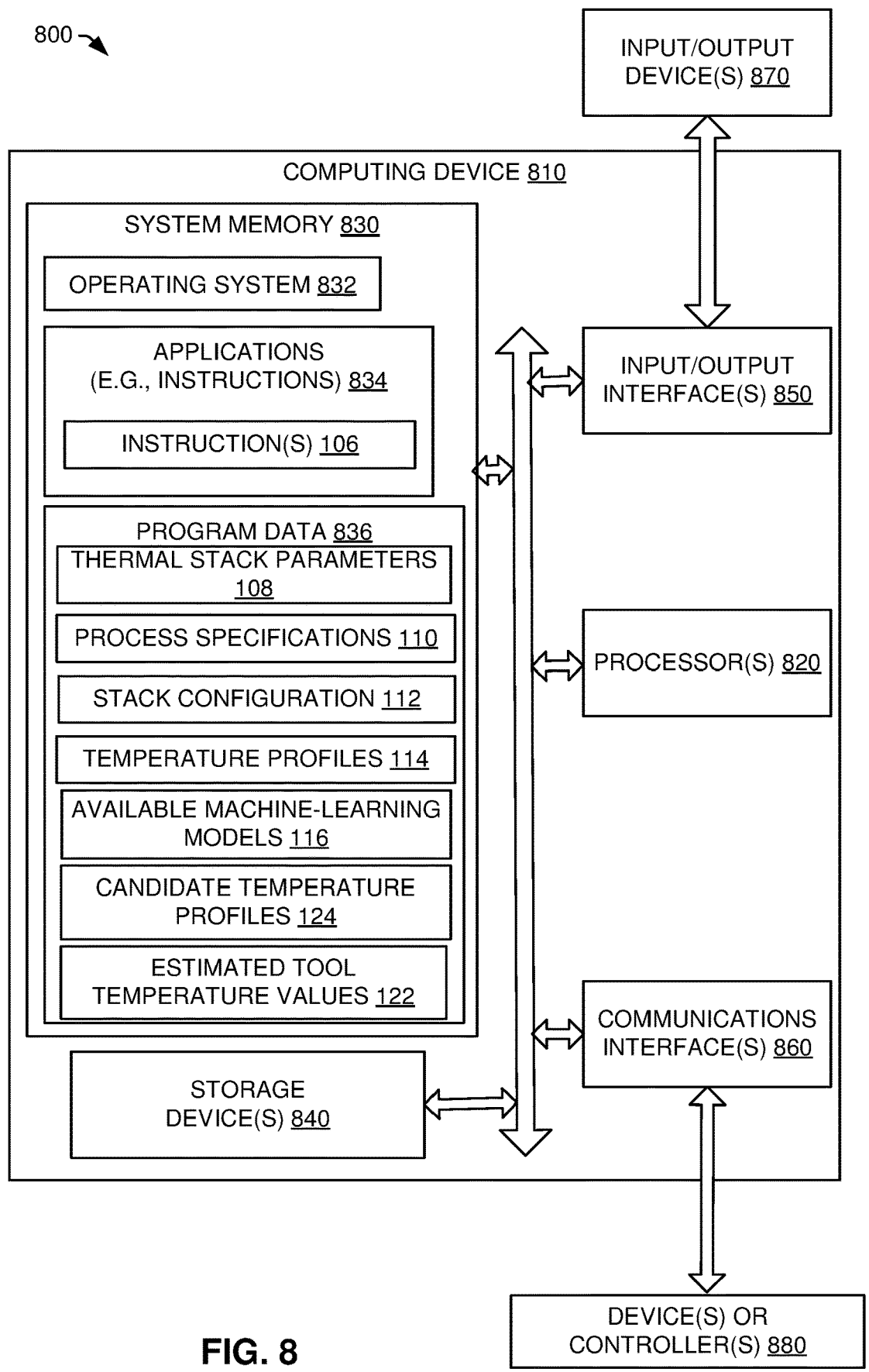
FIG. 8 is a block diagram of a computing environment including a computing device configured to support aspects of computer-implemented methods and computer-executable program instructions (or code) according to the present disclosure.

FIG. 8 is a block diagram of a computing environment 800 including a computing device 810 configured to support aspects of computer-implemented methods and computer-executable program instructions (or code) according to the present disclosure. For example, the computing device 810, or portions thereof, is configured to execute instructions to initiate, perform, or control one or more operations described in more detail above with reference to FIGS. 1-14. In a particular aspect, the computing device 810 can include the controller 102, one or more servers, one or more virtual devices, or a combination thereof.

The computing device 810 includes one or more processors 820. In a particular aspect, the processor(s) 820 correspond to the processor(s) 126 of FIG. 1. The processor(s) 820 is configured to communicate with system memory 830, one or more storage devices 840, one or more input/output interfaces 850, one or more communications interfaces 860, or any combination thereof. The system memory 830 includes volatile memory devices (e.g., random access memory (RAM) devices), nonvolatile memory devices (e.g., read-only memory (ROM) devices, programmable read-only memory, and flash memory), or both. The system memory 830 stores an operating system 832, which can include a basic input/output system for booting the computing device 810 as well as a full operating system to enable the computing device 810 to interact with users, other programs, and other devices. The system memory 830 stores system (program) data 836, such as the instructions 106, the thermal stack parameters 108, the process specifications 110, the stack configuration 112, the temperature profiles 114, the estimated tool temperature values 122, the candidate temperature profiles 124, the available machine-learning models 116 of FIG. 1, or a combination thereof.

The system memory 830 includes one or more applications 834 (e.g., sets of instructions) executable by the processor(s) 820. As an example, the one or more applications 834 include the instructions 106 executable by the processor(s) 820 to initiate, control, or perform one or more operations described with reference to FIGS. 1-7. To illustrate, the one or more applications 834 include the instructions 106 executable by the processor(s) 820 to initiate, control, or perform one or more operations described with reference to the sensor data 130, the command(s) 132, the configuration data 134, or a combination thereof.

In a particular implementation, the system memory 830 includes a non-transitory, computer readable medium (e.g., a computer-readable storage device) storing the instructions 106 that, when executed by the processor(s) 820, cause the processor(s) 820 to initiate, perform, or control operations to automatically control a heating device during a heating operation.

The operations include obtaining sensor data indicating measured temperatures within a heating vessel during a first portion of a heating operation, wherein the sensor data includes tool temperature values and interior temperature values, and wherein a tool temperature value represents a temperature measurement of a portion of a tool within the heating vessel and an interior temperature value represents a temperature measurement of ambient conditions within the heating vessel. The operations also include determining a plurality of sets of thermal stack parameters from a plurality of sets of candidate thermal stack parameters, wherein each set of candidate thermal stack parameters is descriptive of a respective configuration of an in-process thermal stack modeled by a first machine learning model to generate one or more estimated tool temperature values, and wherein the in-process thermal stack comprises the tool and a part coupled to the tool. The operations also include determining a temperature profile for a second portion of the heating operation, wherein the temperature profile is determined, via a second machine learning model, based on the plurality of sets of thermal stack parameters and one or more process specifications of the in-process thermal stack.

The one or more storage devices 840 include nonvolatile storage devices, such as magnetic disks, optical disks, or flash memory devices. In a particular example, the storage devices 840 include both removable and non-removable memory devices. The storage devices 840 are configured to store an operating system, images of operating systems, applications (e.g., one or more of the applications 834), and program data (e.g., the program data 836). In a particular aspect, the system memory 830, the storage devices 840, or both, include tangible computer-readable media. In a particular aspect, one or more of the storage devices 840 are external to the computing device 810.

The one or more input/output interfaces 850 enable the computing device 810 to communicate with one or more input/output devices 870 to facilitate user interaction. For example, the one or more input/output interfaces 850 can include a display interface, an input interface, or both. For example, the input/output interface 850 is adapted to receive input from a user, to receive input from another computing device, or a combination thereof. In some implementations, the input/output interface 850 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 870 include one or more user interface devices and displays, including some combination of buttons, keyboards, pointing devices, displays, speakers, microphones, touch screens, and other devices. In a particular aspect, the input/output device(s) 870 include the interface(s) 128 of FIG. 1.

The processor(s) 820 are configured to communicate with devices or controllers 880 via the one or more communications interfaces 860. For example, the one or more communications interfaces 860 can include a network interface. The devices or controllers 880 can include, for example, the heating vessel 136.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIG. 1-7. In some implementations, part or all of one or more of the operations or methods of FIGS. 1-7 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

According to Clause 1, a method includes obtaining sensor data (130) indicating measured temperatures within a heating vessel (136) during a first portion of a heating operation, wherein the sensor data includes tool temperature values and interior temperature values, wherein a tool temperature value represents a temperature measurement of a portion of a tool (152, 154) within the heating vessel and an interior temperature value represents a temperature measurement of ambient conditions within the heating vessel; determining a plurality of sets of thermal stack parameters (108) from a plurality of sets of candidate thermal stack parameters, wherein each set of candidate thermal stack parameters is descriptive of a respective configuration (112)

of an in-process thermal stack (148, 150) modeled by a first machine learning model (118) to generate one or more estimated tool temperature values (122), and wherein the in-process thermal stack comprises the tool and a part (156, 158) coupled to the tool; and determining a temperature profile (114) for a second portion of the heating operation, wherein the temperature profile is determined, via a second machine learning model (120), based on the plurality of sets of thermal stack parameters and one or more process specifications (110) of the in-process thermal stack.

Clause 2 includes the method of Clause 1, further including sending commands (132) or configuration data (134) to the heating vessel to cause the heating vessel to operate according to the temperature profile.

Clause 3 includes the method of Clause 1 or Clause 2, wherein the temperature profile indicates one or more target interior temperature values, one or more interior temperature change rates, one or more dwell times associated with a particular target interior temperature value, or a combination thereof.

Clause 4 includes the method of any of Clauses 1 to 3, wherein the tool temperature values are obtained from temperature sensors (144, 146) coupled to a first surface of (164) the tool, wherein the part is coupled to a second surface (166) of the tool, and wherein the second surface of the tool is opposite the first surface of the tool.

Clause 5 includes the method of any of Clauses 1 to 4, wherein the heating vessel corresponds to an oven or an autoclave.

Clause 6 includes the method of any of Clauses 1 to 5, wherein the heating operation facilitates exothermic curing of one or more materials of the part.

Clause 7 includes the method of any of Clauses 1 to 6, wherein a first surface and a second surface of the in-process thermal stack are exposed to the ambient conditions within the heating vessel, and wherein the first surface of the in-process thermal stack corresponds to a surface of the tool and the second surface of the in-process thermal stack corresponds to a surface of the part.

Clause 8 includes the method of any of Clauses 1 to 7, wherein the method further includes determining the multiple sets of candidate thermal stack parameters based on one or more specified start values, one or more specified step values, and one or more specified stop values.

Clause 9 includes the method of any of Clauses 1 to 8, wherein each set of candidate thermal stack parameters indicates values of one or more boundary conditions, a value of a thickness of the part, a value of a thickness of the tool, one or more temperature values associated with the tool, or some combination thereof.

Clause 10 includes the method of Clause 9, wherein the values of one or more boundary conditions comprise first heat transfer coefficient at a first surface of the in-process thermal stack and of a second heat transfer coefficient at a second surface of the in-process thermal stack.

Clause 11 includes the method of any of clauses 1-10, wherein the method further includes: for each set of candidate thermal stack parameters from the plurality of sets of candidate thermal stack parameters: providing input to the first machine-learning model, wherein the input indicates the set of candidate thermal stack parameters and a time sequence of the interior temperature values; and obtaining output from the first machine-learning model, wherein the output indicates one or more estimated tool temperature values based on the input.

Clause 12 includes the method of clause 11, wherein determining the plurality of sets of thermal stack parameters from the plurality of sets of candidate thermal stack parameters comprises selecting, as the plurality of sets of thermal stack parameters, a subset of the plurality of sets of candidate thermal stack parameters for which the one or more estimated tool temperature values most closely match the tool temperature values indicated by the sensor data.

Clause 13 includes the method of any of Clauses 1 to 12, wherein said determining the plurality of sets of thermal stack parameters includes: obtaining multiple sets of candidate thermal stack parameters; for each set of candidate thermal stack parameters from the multiple sets of candidate thermal stack parameters: providing input to the first machine learning model, wherein the input indicates the set of candidate thermal stack parameters and a time sequence of the interior temperature values; and obtaining output from the first machine learning model, wherein the output indicates one or more estimated tool temperature value based on the input; and selecting, as the plurality of sets of thermal stack parameters, a subset of the multiple sets of candidate thermal stack parameters for which the one or more estimated tool temperature values most closely match the tool temperature values indicated by the sensor data.

Clause 14 includes the method of Clause 13, wherein said obtaining the multiple sets of candidate thermal stack parameters comprises performing a look-up operation to access the multiple sets of candidate thermal stack parameters from a memory (104).

Clause 15 includes the method of Clause 13 or Clause 14, wherein said obtaining the multiple sets of candidate thermal stack parameters comprises determining the multiple sets of candidate thermal stack parameters based on one or more specified start values, one or more specified step values, and one or more specified stop values.

Clause 16 includes the method of any of Clauses 1 to 15, wherein the method further includes selecting the first machine learning model, the second machine learning model, or both, from among a plurality of available machine learning models based, at least in part, on one or more materials of the in-process thermal stack.

Clause 17 includes the method of any of Clauses 1 to 16, wherein said determining the temperature profile for the second portion of the heating operation includes: obtaining a plurality of candidate temperature profiles (124); providing multiple combinations of inputs to the second machine learning model, wherein each combination of input to the second machine learning model includes a respective set of thermal stack parameters from the plurality of sets of thermal stack parameters and a respective candidate temperature profile from the plurality of candidate temperature profiles; obtaining output from the second machine learning model for each combination of input of the multiple combinations of input, wherein the output for a particular combination of input indicates whether operating the heating vessel based on parameters indicated by the particular combination of input is expected to satisfy the one or more process specifications; and selecting, as the temperature profile, a particular candidate temperature profile from the plurality of candidate temperature profiles associated with a combination of input that is expected to satisfy the one or more process specifications.

Clause 18 includes the method of Clause 17, wherein said obtaining the plurality of candidate temperature profiles includes determining the plurality of candidate temperature profiles based on one or more specified start values, one or more specified step values, and one or more specified stop values.

Clause 19 includes the method of Clause 17 or Clause 18, wherein said selecting the particular candidate temperature profile includes: identifying a subset of candidate temperature profiles from among the plurality of candidate temperature profiles, wherein each candidate temperature profile of the subset of candidate temperature profiles is associated with a combination of input that is expected to satisfy the one or more process specifications; and selecting the particular candidate temperature profile from among the subset of candidate temperature profiles based on a selection criterion.

Clause 20 includes the method of Clause 19, wherein the selection criterion specifies selection of a candidate temperature profile based on an associated time duration of the second portion of the heating operation, an associated peak temperature of the second portion of the heating operation, or a combination thereof.

Clause 21 includes the method of any of Clauses 1 to 20, wherein multiple in-process thermal stacks are disposed in the heating vessel during the heating operation, and wherein the method further includes: obtaining sensor data for each of the multiple in-process thermal stacks; determining a plurality of sets of thermal stack parameters for each of the multiple in-process thermal stacks; and determining the temperature profile for the second portion of the heating operation based on the plurality of sets of thermal stack parameters for each of the multiple in-process thermal stacks and determining one or more process specifications for each for each of the multiple in-process thermal stacks.

Clause 22 includes the method of Clause 21, wherein the multiple in-process thermal stacks correspond to two or more cross-sections of the part, two or more cross-sections of the tool, two or more parts, two or more tools, or some combination thereof.

Clause 23 includes the method of Clause 21 or Clause 22, wherein the method further includes selecting the second machine learning model from among a plurality of available second machine learning models (116) based on materials of the multiple in-process thermal stacks and the one or more process specifications of the multiple in-process thermal stacks.

Clause 24 includes the method of any of Clauses 21 to 23, wherein the method further includes selecting the first machine learning model, the second machine learning model, or both, from among a plurality of available machine learning models based, at least in part, on one or more materials of the in-process thermal stack.

According to Clause 25, a non-transient, computer-readable medium stores instructions that, when executed by one or more processors, cause the one or more processors to perform operations including: obtaining sensor data indicating measured temperatures within a heating vessel during a first portion of a heating operation, wherein the sensor data includes tool temperature values and interior temperature values, wherein a tool temperature value represents a temperature measurement of a tool within the heating vessel and an interior temperature value represents a temperature measurement of ambient conditions within the heating vessel; determining a plurality of sets of thermal stack parameters, wherein each set of thermal stack parameters is descriptive of a respective configuration of an in-process thermal stack modeled by a first machine learning model to generate the tool temperature values responsive to the interior temperature values, the in-process thermal stack comprising the tool and a part coupled to the tool; and determining a temperature profile for a second portion of the heating operation, wherein the temperature profile is determined, via a second machine learning model, based on the plurality of sets of thermal stack parameters and one or more process specifications of the in-process thermal stack.

Clause 33 includes the non-transient, computer-readable medium of Clause 32, wherein the instructions, when executed by the one or more processors, further cause the one or more processors to perform operations including: determining the plurality of sets of thermal stack parameters comprises: obtaining multiple sets of candidate thermal stack parameters; for each set of candidate thermal stack parameters of the multiple sets of candidate thermal stack parameters: providing input to the first machine learning model, wherein the input indicates the set of candidate thermal stack parameters and a time sequence of the interior temperature values; and obtaining output from the first machine learning model, wherein the output indicates one or more estimated tool temperature value based on the input; and selecting, as the plurality of sets of thermal stack parameters, a subset of the multiple sets of candidate thermal stack parameters for which the one or more estimated tool temperature values most closely match the tool temperature values indicated by the sensor data; and determining the temperature profile for the second portion of the heating operation comprises: obtaining a plurality of candidate temperature profiles; providing multiple combinations of inputs to the second machine learning model, wherein each combination of input to the second machine learning model includes a respective set of thermal stack parameters of the plurality of sets of thermal stack parameters and a respective candidate temperature profile of the plurality of candidate temperature profiles; obtaining output from the second machine learning model for each combination of input of the multiple combinations of input, wherein the output for a particular combination of input indicates whether operating the heating vessel based on parameters indicated by the particular combination of input is expected to satisfy the one or more process specifications; and selecting as the temperature profile a particular candidate temperature profile of the plurality of candidate temperature profiles associated with a combination of input that is expected to satisfy the one or more process specifications.

According to Clause 34, a system includes: a memory configured to store instructions; and one or more processors configured to: obtain sensor data indicating measured temperatures within a heating vessel during a first portion of a heating operation, wherein the sensor data includes tool temperature values and interior temperature values, wherein a tool temperature value represents a temperature measurement of a tool within the heating vessel and an interior temperature value represents a temperature measurement of ambient conditions within the heating vessel; determine a plurality of sets of thermal stack parameters, wherein each set of thermal stack parameters is descriptive of a respective configuration of an in-process thermal stack modeled by a first machine learning model to generate the tool temperature values responsive to the interior temperature values, the in-process thermal stack comprising the tool and a part coupled to the tool; and determine a temperature profile for a second portion of the heating operation, wherein the temperature profile is determined, via a second machine learning model, based on the plurality of sets of thermal stack parameters and one or more process specifications of the in-process thermal stack.

Clause 35 includes the system of Clause 34, wherein the one or more processors are further configured to: determine the plurality of sets of thermal stack parameters such that the one or more processors are further configured to: obtain multiple sets of candidate thermal stack parameters; for each set of candidate thermal stack parameters of the multiple sets of candidate thermal stack parameters: provide input to the first machine learning model, wherein the input indicates the set of candidate thermal stack parameters and a time sequence of the interior temperature values; and obtain output from the first machine learning model, wherein the output indicates one or more estimated tool temperature value based on the input; and select, as the plurality of sets of thermal stack parameters, a subset of the multiple sets of candidate thermal stack parameters for which the one or more estimated tool temperature values most closely match the tool temperature values indicated by the sensor data; and determine the temperature profile for the second portion of the heating operation such that the one or more processors are further configured to: obtain a plurality of candidate temperature profiles; provide multiple combinations of inputs to the second machine learning model, wherein each combination of input to the second machine learning model includes a respective set of thermal stack parameters of the plurality of sets of thermal stack parameters and a respective candidate temperature profile of the plurality of candidate temperature profiles; obtain output from the second machine learning model for each combination of input of the multiple combinations of input, wherein the output for a particular combination of input indicates whether operating the heating vessel based on parameters indicated by the particular combination of input is expected to satisfy the one or more process specifications; and select as the temperature profile a particular candidate temperature profile of the plurality of candidate temperature profiles associated with a combination of input that is expected to satisfy the one or more process specifications.

According to Clause 36, a device includes a memory configured to store instructions and a processor configured to execute the instructions to perform the operations of any of the methods of Clause 1 to 24.

According to Clause 37, a non-transient, computer-readable medium stores instructions that, when executed by one or more processors, cause the one or more processors to perform operations of any of the methods of Clause 1 to 24.

What is claimed is:

1. A method comprising:
    obtaining sensor data indicating measured temperatures within a heating vessel during a first portion of a heating operation, wherein the sensor data includes tool temperature values and interior temperature values, wherein a tool temperature value represents a temperature measurement of a portion of a tool within the heating vessel, and wherein an interior temperature value represents a temperature measurement of ambient conditions within the heating vessel;
    determining a plurality of sets of thermal stack parameters from a plurality of sets of candidate thermal stack parameters, wherein each set of candidate thermal stack parameters is descriptive of a respective configuration of an in-process thermal stack modeled by a first machine learning model to generate one or more estimated tool temperature values, wherein the in-process thermal stack comprises the tool and a part coupled to the tool, and wherein for each set of candidate thermal stack parameters from the plurality of sets of candidate thermal stack parameters:
        providing input to the first machine learning model, wherein the input indicates the set of candidate thermal stack parameters and a time sequence of the interior temperature values; and
        obtaining output from the first machine learning model, wherein the output indicates one or more estimated tool temperature values based on the input; and
    selecting, as the plurality of sets of thermal stack parameters, a subset of the plurality of sets of candidate thermal stack parameters for which the one or more estimated tool temperature values corresponds to the tool temperature values indicated by the sensor data;
    determining a temperature profile for a second portion of the heating operation, wherein the temperature profile is determined, via a second machine learning model, based on the plurality of sets of thermal stack parameters and one or more process specifications of the in-process thermal stack;
    sending, based on the temperature profile, one or more commands to the heating vessel; and
    modifying, based on the one or more commands, one or more components of the heating operation of the heating vessel.

2. The method of claim 1, wherein the temperature profile indicates one or more target interior temperature values, one or more interior temperature change rates, one or more dwell times associated with a particular target interior temperature value, or a combination thereof.

3. The method of claim 1, wherein the heating operation facilitates exothermic curing of one or more materials of the part.

4. The method of claim 1, wherein each set of candidate thermal stack parameters indicates values of one or more boundary conditions, a value of a thickness of the part, a value of a thickness of the tool, one or more temperature values associated with the tool, or some combination thereof.

5. The method of claim 4, wherein the values of one or more boundary conditions comprise values of a first heat transfer coefficient at a first surface of the in-process thermal stack and of a second heat transfer coefficient at a second surface of the in-process thermal stack.

6. The method of claim 1, further comprising determining the plurality of sets of candidate thermal stack parameters based on one or more specified start values, one or more specified step values, and one or more specified stop values.

7. The method of claim 1, wherein said determining the temperature profile for the second portion of the heating operation comprises:
    obtaining a plurality of candidate temperature profiles;
    providing multiple combinations of inputs to the second machine learning model, wherein each combination of input to the second machine learning model includes a respective set of thermal stack parameters from the plurality of sets of thermal stack parameters and a respective candidate temperature profile from the plurality of candidate temperature profiles;
    obtaining output from the second machine learning model for each combination of input of the multiple combinations of input, wherein the output for a particular combination of input indicates whether operating the heating vessel based on parameters indicated by the particular combination of input is expected to satisfy the one or more process specifications; and
    selecting as the temperature profile a particular candidate temperature profile from the plurality of candidate temperature profiles associated with a combination of input that is expected to satisfy the one or more process specifications.

8. The method of claim 7, wherein said selecting the particular candidate temperature profile comprises:
identifying a subset of candidate temperature profiles from among the plurality of candidate temperature profiles, wherein each candidate temperature profile of the subset of candidate temperature profiles is associated with a combination of input that is expected to satisfy the one or more process specifications; and
selecting the particular candidate temperature profile from among the subset of candidate temperature profiles based on a selection criterion.

9. The method of claim 8, wherein the selection criterion specifies selection of a candidate temperature profile based on an associated time duration of the second portion of the heating operation, an associated peak temperature of the second portion of the heating operation, or a combination thereof.

10. The method of claim 7, wherein said obtaining the plurality of candidate temperature profiles comprises determining the plurality of candidate temperature profiles based on one or more specified start values, one or more specified step values, and one or more specified stop values.

11. The method of claim 1, wherein multiple in-process thermal stacks are disposed in the heating vessel during the heating operation, and wherein the method further comprises:
obtaining sensor data for each of the multiple in-process thermal stacks;
determining a plurality of sets of thermal stack parameters for each of the multiple in-process thermal stacks; and
determining the temperature profile for the second portion of the heating operation based on the plurality of sets of thermal stack parameters for each of the multiple in-process thermal stacks and based on one or more process specifications for each of the multiple in-process thermal stacks.

12. The method of claim 11, wherein the multiple in-process thermal stacks correspond to two or more cross-sections of the part, two or more cross-sections of the tool, two or more parts, two or more tools, or some combination thereof.

13. The method of claim 11, further comprising selecting the second machine learning model from among a plurality of available second machine learning models based on materials of the multiple in-process thermal stacks and the one or more process specifications of the multiple in-process thermal stacks.

14. The method of claim 1, further comprising selecting the first machine learning model, the second machine learning model, or both, from among a plurality of available machine learning models based, at least in part, on one or more materials of the in-process thermal stack.

15. A non-transient, computer-readable medium storing instructions executable by one or more processors to perform operations comprising:
obtaining sensor data indicating measured temperatures within a heating vessel during a first portion of a heating operation, wherein the sensor data includes tool temperature values and interior temperature values, wherein a tool temperature value represents a temperature measurement of a tool within the heating vessel, and wherein an interior temperature value represents a temperature measurement of ambient conditions within the heating vessel;
determining a plurality of sets of thermal stack parameters, wherein each set of thermal stack parameters is descriptive of a respective configuration of an in-process thermal stack modeled by a first machine learning model to generate the tool temperature values responsive to the interior temperature values, and wherein the in-process thermal stack comprises the tool and a part coupled to the tool, and wherein for each set of candidate thermal stack parameters from the plurality of sets of candidate thermal stack parameters:
providing input to the first machine learning model, wherein the input indicates the set of candidate thermal stack parameters and a time sequence of the interior temperature values; and
obtaining output from the first machine learning model, wherein the output indicates one or more estimated tool temperature values based on the input; and
selecting, as the plurality of sets of thermal stack parameters, a subset of the plurality of sets of candidate thermal stack parameters for which the one or more estimated tool temperature values corresponds to the tool temperature values indicated by the sensor data;
determining a temperature profile for a second portion of the heating operation, wherein the temperature profile is determined, via a second machine learning model, based on the plurality of sets of thermal stack parameters and one or more process specifications of the in-process thermal stack;
sending, based on the temperature profile, one or more commands to the heating vessel; and
modifying, based on the one or more commands, one or more components of the heating operation of the heating vessel.

16. The non-transient, computer-readable medium of claim 15, wherein:
said determining the temperature profile for the second portion of the heating operation comprises:
obtaining a plurality of candidate temperature profiles;
providing multiple combinations of inputs to the second machine learning model, wherein each combination of input to the second machine learning model includes a respective set of thermal stack parameters of the plurality of sets of thermal stack parameters and a respective candidate temperature profile of the plurality of candidate temperature profiles;
obtaining output from the second machine learning model for each combination of input of the multiple combinations of input, wherein the output for a particular combination of input indicates whether operating the heating vessel based on parameters indicated by the particular combination of input is expected to satisfy the one or more process specifications; and
selecting as the temperature profile a particular candidate temperature profile of the plurality of candidate temperature profiles associated with a combination of input that is expected to satisfy the one or more process specifications.

17. The non-transient, computer-readable medium of claim 15, wherein the temperature profile indicates one or more target interior temperature values, one or more interior temperature change rates, one or more dwell times associated with a particular target interior temperature value, or a combination thereof.

18. The non-transient, computer-readable medium of claim 15, wherein the heating operation facilitates exothermic curing of one or more materials of the part.

19. A system comprising:
a memory configured to store instructions; and
one or more processors configured to:
- obtain sensor data indicating measured temperatures within a heating vessel during a first portion of a heating operation, wherein the sensor data includes tool temperature values and interior temperature values, wherein a tool temperature value represents a temperature measurement of a tool within the heating vessel, and wherein an interior temperature value represents a temperature measurement of ambient conditions within the heating vessel;
- determine a plurality of sets of thermal stack parameters, wherein each set of thermal stack parameters is descriptive of a respective configuration of an in-process thermal stack modeled by a first machine learning model to generate the tool temperature values responsive to the interior temperature values, and wherein the in-process thermal stack comprises the tool and a part coupled to the tool, and wherein for each set of candidate thermal stack parameters from the plurality of sets of candidate thermal stack parameters:
  - provide input to the first machine learning model, wherein the input indicates the set of candidate thermal stack parameters and a time sequence of the interior temperature values; and
  - obtain output from the first machine learning model, wherein the output indicates one or more estimated tool temperature values based on the input; and
- select, as the plurality of sets of thermal stack parameters, a subset of the plurality of sets of candidate thermal stack parameters for which the one or more estimated tool temperature values corresponds to the tool temperature values indicated by the sensor data;
- determine a temperature profile for a second portion of the heating operation, wherein the temperature profile is determined, via a second machine learning model, based on the plurality of sets of thermal stack parameters and one or more process specifications of the in-process thermal stack;
- send, based on the temperature profile, one or more commands to the heating vessel; and
- modify, based on the one or more commands, one or more components of the heating operation of the heating vessel.

20. The system of claim 19, wherein the one or more processors are further configured to:
- determine the temperature profile for the second portion of the heating operation such that the one or more processors are further configured to:
  - obtain a plurality of candidate temperature profiles;
  - provide multiple combinations of inputs to the second machine learning model, wherein each combination of input to the second machine learning model includes a respective set of thermal stack parameters of the plurality of sets of thermal stack parameters and a respective candidate temperature profile of the plurality of candidate temperature profiles;
  - obtain output from the second machine learning model for each combination of input of the multiple combinations of input, wherein the output for a particular combination of input indicates whether operating the heating vessel based on parameters indicated by the particular combination of input is expected to satisfy the one or more process specifications; and
  - select as the temperature profile a particular candidate temperature profile of the plurality of candidate temperature profiles associated with a combination of input that is expected to satisfy the one or more process specifications.

* * * * *